United States Patent
Kamo

Patent Number: 6,154,323
Date of Patent: Nov. 28, 2000

[54] ZOOM LENS SYSTEM USING A DIFFRACTIVE OPTICAL ELEMENT

[75] Inventor: Yuji Kamo, Hachioji, Japan

[73] Assignee: Olympus Optical Co., Ltd., Tokyo, Japan

[21] Appl. No.: 09/276,707

[22] Filed: Mar. 26, 1999

[30] Foreign Application Priority Data

Apr. 10, 1998 [JP] Japan .................................. 10-098787

[51] Int. Cl.⁷ .................................................. G02B 15/14
[52] U.S. Cl. .......................................... 359/691; 359/692
[58] Field of Search .................................... 359/692, 690, 359/688, 687, 691

[56] References Cited

U.S. PATENT DOCUMENTS

| | | | |
|---|---|---|---|
| 5,268,790 | 12/1993 | Chen | 359/558 |
| 5,386,321 | 1/1995 | Kawamura . | |
| 5,481,405 | 1/1996 | Simbal | 359/689 |

FOREIGN PATENT DOCUMENTS

| | | |
|---|---|---|
| 5-113537 | of 1993 | Japan . |
| 8-338946 | 12/1996 | Japan . |
| 9-197273 | 7/1997 | Japan . |
| 9-197274 | 7/1997 | Japan . |

*Primary Examiner*—Georgia Epps
*Assistant Examiner*—Tim Thompson
*Attorney, Agent, or Firm*—Pillsbury Madison & Sutro LLP

[57] ABSTRACT

The invention relates to a high-performance, high-zoom, low-cost zoom lens system which is easy to fabricate due to a reduced number of lenses. The zoom lens system comprises a first lens group G1 having positive refracting power and a second lens group G2 having negative refracting power. For zooming, the spacing between the first and second lens groups varies. At least one diffractive surface $r_{11}$ is used in the zoom lens optical system. Each lens group comprises at least two lenses. The zoom lens system satisfies condition (2) or $50 < \nu_{d2} < 85$ where $\nu_{d2}$ is an Abbe's number of the lens having the largest negative refracting power in the second lens group G2.

34 Claims, 7 Drawing Sheets

21 Transparent
22 Opaque

24 Low-Index
23 High-Index

ZOOM LENS SYSTEM USING A DIFFRACTIVE OPTICAL ELEMENT

BACKGROUND OF THE INVENTION

1. Field of the Invention

The present invention relates generally to a zoom lens system using a diffractive optical element (hereinafter DOE for short), and more specifically to a zoom lens system used for a phototaking optical system for silver-salt cameras, electronic cameras, etc.

2. Discussion of Related Art

Many types of compact cameras with built-in zoom lenses are now commercially available and have become widespread due to user friendliness. Recent zoom lenses having ever higher zoom ratios are also growing in popularity. However, cameras with such zoom lenses incorporated therein are poor in regard to portability because of their increased size. For this reason, there is a strong demand for a compact yet high-power zoom lens.

As the zoom ratio of a zoom lens becomes high, some problems arise in conjunction with correction of aberrations. Generally, a zoom lens is constructed of a plurality of moving lens groups to vary the focal length by varying spacings between them. However, the heights of light rays through each lens group vary upon zooming, resulting in a variation in the amount of aberrations produced. For this reason, even when the remnant aberrations at each zoom lens group is canceled and corrected by other zoom lens groups, it is impossible to maintain good performance over the entire zooming spaces because aberration fluctuations are still produced upon zooming. In particular, a high-power zoom lens is susceptible to large aberration fluctuations. To reduce such aberration fluctuations, it is thus required that sufficient correction of aberrations be made at individual zoom lens groups. In the prior art, this has been achieved by increasing the number of lenses in each lens group.

However, this is unfavorable for achieving size reductions of the lens system because the length of the lens system becomes physically long. In recent years, many proposals have been made to construct a zoom lens using an aspherical surface or surfaces with no increase in the number of lenses involved. So far, two- and three-group types have been widely used for zoom lenses. However, the two-group type is superior to the three-group type using an increased number of lenses with a complicated lens barrel.

Therefore, if an aspherical lens is properly used with the two-group type, then spherical aberration and coma can be effectively corrected with no increase in the number of lenses, and so high zoom ratio and compactness can be achieved at the same time. This is already disclosed in JP-A 8-338946. In the zoom lens disclosed there, the first and second lens groups are each constructed of two lenses in spite of a zoom ratio of 1.9 to 2.9. Chromatic aberrations are corrected by proper determination of the Abbe's numbers of the lenses.

For users, on the other hand, zoom lenses available at an ever-more reasonable price are demanded.

The cost of a certain lens system may be cut down by decreasing the number of lenses involved, as mentioned above. However, such cost reductions may also be achieved by constructing lenses of plastics. Plastic materials are cheaper, and can be more easily processed into aspherical lenses at a much lower cost, as compared with glass materials. Thus, plastics is very favorable in view of cost-effectiveness. However, a grave problem with plastics is that its refractive index or shape properties are susceptible to changes depending on environmental changes such as temperature or humidity changes. For instance, when a lens having power is constructed of plastics, a shift of the focus position is likely to occur depending on environmental changes, resulting in a drop in performance. At a telephoto end of a zoom lens in particular, this shift becomes large enough to have more of an adverse influence on performance.

To solve such problems thereby achieving both low cost and high performance, the applicant has come up with a zoom lens system using a powerless lens, as typically disclosed in JP-A 5-113537. In this case, the zoom ratio achieved is of the order of 1.5 to 2.2.

On the other hand, attention is recently focused on a diffractive optical element (DOE) which can make use of diffraction to bend light rays. The DOE is different from a general vitreous material in that it has an Abbe's number of –3.45 or reciprocal dispersion, and has a characteristic feature of enabling achromatization using a positive power and positive power combination, unlike the prior art refractive systems.

Some exemplary applications of such a diffractive optical element to a zoom lens are disclosed in JP-A's 9-197273 and 9-197274. JP-A 9-197273 shows a two-group type zoom lens comprising a first lens group consisting of one positive lens and a second lens group consisting of one negative lens, and using a diffractive surface. The zoom ratio is of the order of 1.6 to 1.9. JP-A 9-197274 discloses a two-group type zoom lens consisting of four lenses and using a diffractive surface, as in the aforesaid JP-A 8-338946. Examples 2 and 5 teach that a zoom ratio of as high as about 3.4 is achievable.

However, these prior art zoom lenses have such problems as mentioned below.

The zoom lens system set forth in JP-A 8-338946 is constructed of four lenses. As the number of lenses decreases, however, it is impossible to make sufficient correction for chromatic aberrations because the aspherical surface itself makes no contribution to correction of the chromatic aberrations. Even given the proper determination of the Abbe's numbers of the lenses, no sufficient performance can be obtained due to the limitation of correction.

JP-A 9-197274 shows the correction of chromatic aberrations by using a diffractive optical element in a similar arrangement. However, the zoom lens disclosed fails to take full advantage of the diffractive optical element to make sufficient correction for chromatic aberration, partly because of an imbalance between longitudinal chromatic aberration and chromatic aberration of magnification, and partly because of increased secondary spectra. Thus, this zoom lens is still less than satisfactory in terms of performance although it has high power.

For a zoom lens system comprising a reduced number of lenses such as one set forth in JP-A 8-338946 or JP-A 9-197274, it is required to increase the powers of a positive lens and a negative lens so that aberrations are corrected while the power of each lens group is kept. This results in an increased sensitivity to fabrication errors. For instance, when there is an error in the curvature of each surface in the first lens group or in the spacing between lenses in the second lens group, a very large focus position shift occurs at the telephoto end. It is thus required to place fabrication accuracy under severe control. However, this leads to another problem in connection with lens processing or lens assembly.

JP-A 5-113537 shows the use of a powerless plastic lens thereby achieving cost reductions. However, an arrangement using a powerless lens has a design defect that chromatic aberrations cannot be corrected. Further, this arrangement is applicable only to a zoom lens system having relatively low power; that is, it has a very narrow application, because only one lens having power is used in the second lens group, and so some chromatic aberrations remain theoretically.

JP-A 9-197273 shows that each lens group is constructed of one lens and remnant chromatic aberrations are corrected with a diffractive optical element. Correction of spherical aberration and coma remains still insufficient; that is, the comprehensive performance is still less than satisfactory. The arrangement disclosed uses a glass lens having a very large aspherical amount, and so fails to achieve significant cost reductions. While this arrangement uses a plastic material lens, no care is taken of a drop in performance depending on environmental changes such as temperature or humidity changes. Thus, many practical problems remain unsolved.

JP-A 9-197274 shows that each lens group is constructed of two lenses, and chromatic aberrations are corrected with a diffractive optical element. However, the cost problem remains unsolved because of using a glass aspherical surface. Although the third positive lens is made up of plastics, a performance problem associated with environmental changes remains unsolved because that lens has strong power.

SUMMARY OF THE INVENTION

In view of such problems associated with the prior art as mentioned above, one object of the present invention is to provide a high-performance plus high-power zoom lens system comprising a reduced number of lenses.

Another object of the present invention is to provide a high-performance yet low-cost zoom lens system which is easier to fabricate than ever before.

Yet another object of the present invention is to provide a high-performance yet low-cost zoom lens system comprising a reduced number of lenses.

According to the first aspect of the present invention, these objects are achieved by the provision of a zoom lens system characterized by:

comprising, in order from an object side thereof, a first lens group having positive refracting power and a second lens group having negative refracting power with a spacing therebetween varying for zooming, each of said first lens group and said second lens group comprising at least two lenses;

including at least one aspherical surface therein; and satisfying the following condition (2):

$$50 < v_{d2} < 85 \qquad (2)$$

where $v_{d2}$ is an Abbe's number of a lens having the largest refracting power in the second lens group.

According to the second aspect of the present invention, there is provided a zoom lens system characterized by comprising at least two lens groups with a spacing therebetween varying for zooming, wherein a diffractive surface is used on at least one surface in at least one lens group, said lens group comprising two lenses, a lens having strong power and a powerless lens.

According to the third aspect of the present invention, there is provided a zoom lens system characterized by comprising at least two lens groups with a spacing therebetween varying for zooming, wherein either one of said lens groups comprises a plastic powerless lens having an aspherical surface and a diffractive surface.

The reason why the above arrangements are used in the present invention will now be explained with reference to their actions.

First, the arrangement of the zoom lens system according to the first aspect of the invention is explained with reference to its action.

To increase the zoom ratio of a zoom lens with no increase in the number of lenses used therein, it is required to achieve more reductions in the aberrations produced at J each lens group, as already explained in the "background of the invention". The use of an aspherical surface enables monochromatic aberrations such as spherical aberration, coma and astigmatism to be corrected by at least two lenses, and so renders it possible to make effective correction for the aberrations at the zoom lens groups with no increase in the number of lenses. In view of performance, however, the object of the present invention cannot be achieved only by use of the aspherical surface because the aspherical surface cannot make correction for chromatic aberrations by itself. It is thus required to make use of other means for correcting the chromatic aberrations.

For correction of such chromatic aberrations, at least two lens elements must be used in combination. To, for instance, correct chromatic aberrations by a combination of thin contact lens elements, it is required to satisfy the following equation (a) with respect to the power and Abbe's number of each lens:

$$1/f_1 v_1 + 1/f_2 v_2 = 0 \qquad (a)$$

where $f_1$ and $f_2$ are focal lengths of the lenses and $v_1$ and $v_2$ are Abbe's numbers of the lenses.

It is also required to satisfy the following equation (b):

$$(1/f_1 v_1)(1-d/f_2) + (1/f_2 v_2)(1-d/f_1) = 0 \qquad (b)$$

where d is a spacing between the two lenses.

Equation (b) indicates that if two lenses are used in a zoom lens group, many power and Abbe's number combinations are then available to correct chromatic aberrations. However, a combination of lenses having large powers results in a radius-of-curvature decrease, and so causes monochromatic aberrations such as coma to become worse even when an aspherical surface is used, while a combination of lenses having small powers is contrary to compactness due to an increase in the total length of the system. In other words, practically available lens combinations are not appreciably large in number. Equation (b) is an approximation expression with respect to thin lenses. Both longitudinal chromatic aberration and chromatic aberration of magnification cannot always be corrected by use of two lenses, partly because some chromatic aberration of magnification correlates with the heights of marginal rays. Thus, it is actually difficult to design a compact zoom lens group with both longitudinal chromatic aberration and chromatic aberration of magnification well corrected, using a prior art refractive lens arrangement, for instance, as little as two lenses.

On the other hand, the diffractive optical element has a diffractive surface of very high dispersion. Even when the diffractive optical element does not have large power, it is thus possible to correct for chromatic aberrations without causing monochromatic aberrations to become worse. Since the diffractive element can be fabricated on a lens surface, the chromatic aberrations can be corrected with no further increase in the number of lenses. Therefore, if chromatic aberrations are corrected by using this diffractive optical element in a lens system, it is then possible to effectively achieve the objects of the present invention.

However, the diffractive optical element differs in properties from the prior art refractive lenses, and so some special considerations must be taken into account when it is applied to the high-power zoom lens system of the present invention.

The first consideration for the diffractive optical element is its anomalous dispersion. As explained in the "background of the invention", the diffractive optical element is characterized by having not only an Abbe's number of −3.45 but also an anomalous dispersion value quite different from that of a conventional vitreous material ($\theta_{gF}$ is 0.5353 for S-BSL7 (OHARA) and 0.5922 for S-TIM27 (OHARA), and 0.2957 for DOE). Unless this point is taken into full account, it is then difficult to correct chromatic aberrations, unlike achromatization using the conventional vitreous material.

Here consider a simple case where remnant chromatic aberrations are found from equation (a) when the diffractive optical element is used with a single lens to achromatize C-F colors (for calculation the following two vitreous materials, S-BSL7 ($v_d$=64.1) and S-TIM27 ($v_d$=34.5) are used and on the assumption that the entire length of the system is 100 mm).

As can be seen from FIG. 3 that illustrates remnant aberrations in the case where the diffractive optical element is used with the above two vitreous materials, the two colors may be achromatized with either one of the vitreous materials. However, a clear difference in the remnant chromatic aberrations at other wavelengths is found between S-BSL7 and S-TIM27. Generally, anomalous dispersion enables secondary spectra to be reduced, and so is effective for correction of aberrations. However, the diffractive optical element has an anomalous dispersion value much larger than that of a vitreous material, and so improper use of the diffractive optical element causes chromatic aberrations to become worse due to an imbalance between it and a refractive lens. In other words, strict control of the Abbe's number of the refractive lens must be required because the chromatic aberrations become drastically worse due to a slight difference in the Abbe's number of the refractive lens, as can be understood from the above example.

For the two-group type zoom lens system, on the other hand, it is important in view of correction of aberrations to reduce the amount of chromatic aberrations produced at the second lens group in particular, because the second lens group takes all zooming actions. It is thus preferable to satisfy the following condition (2):

$$50 < v_{d2} < 85 \quad (2)$$

where $v_{d2}$ is an Abbe's number of a lens having the largest negative refracting power in the second lens group.

When the lower limit of 50 in this condition is not reached, chromatic aberrations become worse because secondary spectra due to the diffractive optical element become large. When the upper limit of 85 is exceeded, on the other hand, higher-order aberrations such as spherical aberration and coma are likely to occur because all currently available vitreous materials have a low refractive index.

More preferably, the following condition (3) is satisfied.

$$53 < v_{d2} < 65 \quad (4)$$

To achieve further reductions in the chromatic fluctuations upon zooming, chromatic aberrations must be well corrected at each lens group. When the diffractive surface is used in only one lens group, too, the system is often placed in an ill-balanced state unless the chromatic aberrations at another lens group are placed under control.

To accomplish the objects of the present invention, it is thus desired that the Abbe's numbers of the first and second lens groups satisfy the following conditions (1) and (2) simultaneously:

$$50 < v_{d1} < 85 \quad (1)$$

$$50 < v_{d2} < 85 \quad (2)$$

where $v_{d1}$ is an Abbe's number of a lens having the largest positive refracting power in the first lens group, and $v_{d2}$ is an Abbe's number of a lens having the largest negative refracting power in the second lens group.

When the lower limit of 50 in each condition is not reached, chromatic aberrations become worse because secondary spectra due to the diffractive optical element become large. When the upper limit of 85 is exceeded, on the other hand, higher-order aberrations such as spherical aberration and coma are likely to occur because all currently available vitreous materials have a low refractive index.

More preferably, the following conditions (3) and (4) should be satisfied:

$$55 < v_{d1} < 65 \quad (3)$$

$$53 < v_{d2} < 65 \quad (4)$$

The second consideration for the diffractive optical element is where it is to be positioned. Referring here to chromatic aberrations, it is well known that longitudinal chromatic aberration correlates with the square of the height of an axial marginal ray and chromatic aberration of magnification correlates with (height of a marginal ray x height of a rim chief ray), as can be seen from the theory of aberrations. The diffractive optical element is much higher in dispersion than a conventional lens; that is, even a slight change in these heights causes the amount of chromatic aberrations corrected to vary more drastically as compared with a conventional refractive lens. Especially in the case of an optical system where ray heights change largely between the wide-angle end and the telephoto end, for instance, a zoom lens system, no attention to the ray height changes makes it impossible to satisfy both longitudinal chromatic aberration and chromatic aberration of magnification all over zooming spaces. For this reason, where the diffractive surface is to be positioned is of vital importance.

Zoom lens groups in a zoom lens system produce chromatic aberrations due to their strong powers, and the largest chromatic aberration is produced at a lens that bears the power of each zoom group and so has the strongest power. Referring here to a two-group zoom lens system constructed of a first lens group having positive power and a second lens group having negative power, large chromatic aberrations are produced at a positive lens having the strongest power in the first lens group, and at a negative lens having the strongest power in the second lens group, respectively. Unless the diffractive surface is positioned while the lens arrangement and layout of the system is taken into account, it is then impossible to make satisfactory correction for the chromatic aberrations.

The height of a rim chief ray through the positive lens having the strongest power in the first lens group is not very large, because such a positive lens is often located in the vicinity of an aperture stop. For this reason, the amount of chromatic aberration of magnification produced at this positive lens is not appreciably increased. It is thus not preferable to locate the diffractive surface at a position too far away from the aperture stop, because the chromatic aberration of magnification at the first lens group is overcorrected due to an increase in the height of the rim chief ray passing through the diffractive surface. Unless the Abbe's number of the lens having the strongest positive power is placed under strict control, it is then difficult to correct the chromatic aberrations as already noted.

To accomplish the objects of the present invention, it is therefore required to simultaneously satisfy the following conditions (5) and (6) with respect to the position of the diffractive optical element and the Abbe's number of the refractive lens located in the first lens group:

$$0 < d_{DOE}/f_1 < 0.3 \tag{5}$$

$$50 < v_{d1} < 85 \tag{6}$$

where $d_{DOE}$ is an axial separation from the aperture stop to the diffractive surface, $f_1$ is a focal length of the first lens group, and $v_{d1}$ is an Abbe's number of a lens having the largest positive refracting power in the first lens group.

When the upper limit of 0.3 in condition (5) is exceeded, the chromatic aberration of magnification occurring at the first lens group becomes large, disturbing the balance of aberrations all over the zooming spaces. At the lower limit of 0, the aperture stop collides with the lens. When the lower limit of 50 in condition (6) is not reached, the chromatic aberrations become worse with increasing secondary spectra. When the upper limit of 85 is exceeded, higher-order aberrations such as spherical aberration and coma are likely to occur. This is because all currently available vitreous materials have a low refractive index.

More preferably, the following conditions (7) and (8) should be satisfied:

$$0.02 < d_{DOE}/f_1 < 0.25 \tag{7}$$

$$55 < v_{d1} < 65 \tag{8}$$

It is most preferred that the diffractive surface be fabricated on the surface per se of a positive lens having strong power or a surface of a lens adjacent to an object or image side of a positive lens having the smallest ray height difference, said surface being opposite to said positive lens.

On the other hand, the negative lens having the strongest power in the second lens group is often located nearest to the image side of the system. Since a ray bundle is converged by the positive power of the first lens group, however, the height of an axial marginal ray through the negative lens becomes small on the wide-angle side of the system where the spacing between the first lens group and the second lens group is wide, and relatively large on the telephoto side of the system where the spacing between the first lens group and the second lens group is narrow. Since the distance from the second lens group to the aperture stop varies upon movement of the zoom lens groups, the height of a rim chief ray becomes large on the wide-angle side where that distance becomes long, and relatively small on the telephoto side where that distance becomes short. Thus, the two heights of rays through the negative lens having the strongest power are susceptible to complex changes upon zooming. If the diffractive surface is located at a position too far away from the negative lens, then the ratio of the amounts of longitudinal chromatic aberration and chromatic aberration of magnification corrected changes with a change in the ratio of such ray heights, making it difficult to place both aberrations in a well-balanced state. Unless the Abbe's number of the lens having the strongest negative power is placed under strict control, it is difficult to correct the chromatic aberrations as already noted.

To accomplish the objects of the present invention, it is therefore required to simultaneously satisfy the following conditions (9) and (10) with respect to the position of the diffractive optical element and the Abbe's number of the refractive lens located in the second lens group:

$$0 < |d_{DOE}'/f_2| < 0.35 \tag{9}$$

$$50 < v_{d2} < 85 \tag{10}$$

where $d_{DOE}'$ is an axial separation from the final surface to the diffractive surface in the second lens group, $f_2$ is a focal length of the second lens group, and $v_{d2}$ is an Abbe's number of a lens having the largest negative refracting power in the second lens group.

When the upper limit of 0.35 in condition (9) is exceeded, the chromatic aberration of magnification occurring at the second lens group becomes large, disturbing the balance of aberrations all over the zooming spaces. When the lower limit of 50 in condition (10) is not reached, the chromatic aberrations become worse with increasing secondary spectra. When the upper limit of 85 is exceeded, higher-order aberrations such as spherical aberration and coma are likely to occur. This is because all currently available vitreous materials have a low refractive index.

More preferably, the following conditions (11) and (12) should be satisfied:

$$0 < |d_{DOE}'/f_2| < 0.27 \tag{11}$$

$$53 < v_{d1} < 65 \tag{12}$$

It is most preferred that the diffractive surface be fabricated on the surface per se of a negative lens having strong power or a surface of a lens adjacent to an object or image side of a negative lens having the smallest ray height difference, said surface being opposite to said negative lens.

In a two-group zoom lens system such as one according to the first aspect of the present invention, the second lens group takes all zooming actions. For this reason, it is preferable to make satisfactory correction for chromatic aberrations at the second lens group in particular. In other words, there is a drastic change in the heights of rays through the second lens group as already noted, and so it is preferable to reduce the amount of chromatic aberrations produced at each lens as much as possible. It is accordingly required that the Abbe's number of the positive lens having the strongest power in the second lens group, too, be properly determined. Therefore, it is preferable to satisfy the following condition (13):

$$40 < v_{d2pos} < 65 \tag{13}$$

where $v_{d2pos}$ is an Abbe's number of a lens having the largest positive refracting power in the second lens group.

When the lower limit of 40 in condition (13) is not reached, considerable chromatic aberrations are produced at the second lens group, disturbing the balance of chromatic aberrations all over the zooming spaces. When the upper limit of 65 is exceeded, higher-order aberrations such as spherical aberration and coma are likely to occur. This is because all currently available vitreous materials have a low refractive index.

Next, why the above arrangement is used in the second zoom lens system of the present invention will be explained with reference to its actions.

For a zoom lens system it is important to correct aberrations at each zoom lens group, as already noted. To achieve the second object of the present invention, i.e., high performance and low cost, it is required to make sufficient correction for aberrations at each zoom lens group. When each zoom lens group is constructed of one lens, however, it is in principle impossible to correct chromatic aberrations. Even when an aspherical surface is used in combination with the lens, monochromatic aberration remains under-corrected, thus offering a performance problem. Without at least two lenses, therefore, it is unexpectable to obtain satisfactory performance.

For correction of aberrations, it is preferable to use a positive lens and a negative lens as such two lenses, because not only can chromatic aberrations be corrected but also monochromatic aberrations can be well corrected because they balance each other out by converging effect and diverging effect. To correct these aberrations while the power of each lens group is maintained, however, it is required to make the power of each lens strong, often leading to a serious performance problem due to fabrication errors. With this lens arrangement, therefore, it is impossible to obtain an easy-to-fabricate zoom lens system that is one object of the present invention. Increasing the power of each lens is also not preferable for correction of aberrations because higher-order aberrations such as spherical aberration and coma are likely to occur.

The performance problem due to fabrication errors may be solved or minimized by making the power of each lens weak. Therefore, if one of the above two lenses is constructed of a powerless lens having an aspherical surface, then the power of another lens can be decreased while the power of the zoom lens group is maintained. However, it is impossible to make correction for chromatic aberrations, as discussed in the "background of the invention".

On the other hand, the diffractive surface per se of the diffractive optical element has very high dispersion. If this surface is fabricated on the surface of a lens, it is then possible to make correction for chromatic aberrations with no increase in the number of lenses.

To accomplish the second object of the present invention, it is thus preferable to construct a zoom lens group of two lenses, a lens having strong power and a powerless lens, with a diffractive optical element fabricated thereon. This makes lens processing or lens assembly easy because the performance problem due to fabrication errors can be solved or minimized while high performance and low cost are achieved.

In a certain prior art two-group or three-group zoom lens system having a negative lens group located nearest to an image side thereof, the negative lens group is constructed of two lenses, i.e., a positive lens and a negative lens in order from an object side thereof. Since the powers of both the lenses in this arrangement are very strong, however, there is an assembly problem; if there is an error in the spacing between the lenses, then a very large focus shift occurs at a telephoto end of the system. Unless chromatic aberrations at the negative lens group are well corrected, any satisfactory performance is then unachievable at high zoom ratio. This is because the negative lens group bears a substantial portion of zooming action.

For this reason, if the negative lens group located nearest to the image side is constructed of two lenses, a powerless lens and a negative lens in order from the object side and a diffractive optical element is fabricated thereon, then the sensitivity to an error in the spacing between both lenses can decrease with satisfactory correction of chromatic aberrations.

Then, why the aforesaid arrangement is used for the zoom lens system according to the third aspect of the present invention will now be explained with reference to its action.

It is difficult to cut down the cost of a lens system by use of plastics while performance is maintained. This is because when the lens has power, there is a focus shift change due to environmental changes such as temperature or humidity changes, and when the lens is powerless, it is impossible to correct chromatic aberrations. It is not practical to use plastics to construct a lens having power, because there is a very large focus shift due to environmental changes at a telephoto end of a zoom lens system. To accomplish the third object of the present invention, it is required to use means for correcting chromatic aberrations while a lens is kept powerless.

On the other hand, the diffractive surface per se of the diffractive optical element has very high dispersion. Therefore, if the diffractive optical element is fabricated on the surface of a lens, it is then possible to make correction for chromatic aberrations with no increase in the number of lenses. As typically shown in FIG. 14, the diffractive optical element is of saw-toothed shape in section. The height of each sawtooth and the spacing between adjacent sawteeth are as fine as a few $\mu$m to a few tens of $\mu$m. This saw-toothed element is more difficult to process with high accuracy than a conventional refractive lens. While there are some diffractive surface fabrication processes, it is understood that a molding process having a relatively short processing time is desired for mass production of cameras, etc. In view of accuracy, however, it is very difficult to fabricate diffractive surfaces on glass surfaces by means of molding, and the cost incurred is not appreciably low as well. It is thus preferable to rely upon a plastic injection molding process which can be carried out at low cost with little or no problem associated with processing time and processing accuracy.

On the other hand, JP-A's 6-324262 and 6-331887 show that a diffractive surface is fabricated on a powerless plane-parallel plate located in an optical system. However, this arrangement is not suitable for achieving cost reductions by decreasing the number of lenses, because chromatic aberrations can be corrected but other monochromatic aberrations cannot.

To accomplish the objects of the present invention, it is thus preferable to use a powerless plastic lens having an aspherical surface and a diffractive surface in a zoom lens system.

With this arrangement, it is possible to reduce a performance drop due to environmental changes even when plastics is used. Chromatic aberrations and monochromatic aberrations, which are difficult to correct by use of a powerless lens, can be corrected with the diffractive surface and aspherical surface with no performance drop. This also results in an effective reduction in material processing costs.

A problem with the diffractive optical element is, on the other hand, that unlike a conventional refractive lens, the quantity of light needed for image formation diminishes due to a diffraction efficiency decrease. In other words, the quantity of first-order light of diffracted light diminishes and, instead, unnecessary light such as zero-order light and second-order light increases, resulting in an image formation capability drop, although the diffractive optical element is designed such that the quantity of first-order light is maximized. This is primarily caused by the angle of incidence of light on the diffractive optical element. From the established vector diffraction theory, it is known that the diffraction efficiency of a diffractive optical element varies with the angle of incidence of light thereon (angle-of-incidence dependence). For this reason, when the angle of incidence of light on the diffractive surface is too large, the influence on performance becomes great. When the diffractive optical element is used in a lens system, it is thus preferable to reduce the angle of incidence of light on the diffractive surface as much as possible.

However, when the curvature of a refractive lens having strong power in a lens system is varied to make the angle of incidence small, it is practically difficult to make the size of the lens system small, partly because of an imbalance between aberrations, and partly because of a power change or a principal point shift. However, a powerless lens is little susceptible to the principal point shift even when its curvature is varied. With the powerless lens use in a lens system, therefore, aberrations are relatively less likely to become worse with no increase in the size of the lens system. Therefore, if proper curvature is imparted to the refractive surface of the powerless lens, it is then possible to reduce the angle of incidence of light on the diffractive surface fabricated on the powerless lens, and so effectively reduce the performance drop due to the angle dependence.

More preferably, the powerless lens should have a curvature.

As explained just above, the powerless lens should preferably have such a curvature as to make the angle of incidence of light on the surface small. When the powerless lens is located on the object side with respect to an aperture stop, it should preferably be convex on the object side and when it is located on the image side with respect to the aperture stop, it should preferably be convex on the image side.

The detailed construction of the zoom lens system that can effectively accomplish the second object of the present invention or the second and third objects of the present invention at the same time will now be explained.

Of the zoom lens types, the two-group type zoom lens is favorable for cost reductions in view of the number of lenses and the construction of the lens barrel, as already explained in the "background of the invention". Thus, the construction of the zoom lens system for achieving the greasiest cost reduction comprises a first lens group and a second lens group which are each made up of one powerless lens and one lens having strong power, with a diffractive surface used in each lens group. To correct monochromatic aberrations occurring at the lens having strong power, it is then preferable to provide one aspherical surface on the powerless lens in each of the first and second lens groups. Here the order of location of two lenses in each lens group is explained. In the first lens group, the powerless lens is located at a position away from the aperture stop where there is a large ray height change from the wide-angle end to the telephoto end, and the powerless lens and the positive lens are located in order from the object side, so that coma all over the area can be corrected by the aspherical surface. In the second lens group, the light rays are converged by the first lens group into a fine ray bundle. To correct spherical aberration and coma by the aspherical surface, it is then preferable that the powerless lens is located at a position near to the aperture stop where the heights of the converging light rays are large, and the powerless lens and the negative lens are located in order from the object side. With this arrangement, it is possible to obtain a zoom lens system which is easy to fabricate albeit being inexpensive and having high performance. If the diffractive surface is fabricated on the powerless lens made up of plastics, it is then possible to achieve the zoom lens system according to the third aspect of the present invention at a much lower cost.

If one diffractive surface is used in each lens group so as to correct colors at each lens group, cost reductions can then be effectively achieved, as in the case with the above arrangement. However, the use of two diffractive surfaces causes a large diffraction efficiency drop. To avoid this, it is preferable that in one lens group colors are corrected by the diffractive surface and in another lens group colors are corrected by a doublet. The use of the doublet needs an additional lens having strong power. In view of cost, it is then preferable the additional lens is used in the first lens group having a small lens diameter because the cost added by the additional lens is reduced.

It is thus acceptable that a doublet rather than a diffractive surface is used in the first lens group, and a diffractive surface is used in the second lens group alone. Even with this arrangement, it is possible to achieve a zoom lens system which is inexpensive albeit having high performance.

More specifically, it is preferable that the doublet consists of, in order from the object side, a negative lens and a positive lens. This is because if the cemented surface of the doublet is convex on the object side, it is then possible to make the angle of incidence of rim rays small and make higher-order aberrations unlikely to occur. To achieve significant cost reductions, it is preferable that the first lens group consists of, in order from the object side, a powerless lens and a doublet made up of a negative lens and a positive lens, the second lens group uses at least one diffractive surface and consists of, in order from the object side, a powerless lens and a negative lens, and at least one aspherical surface is used on the powerless lens in each of the first and second lens groups. If the diffractive surface is fabricated on the powerless lens made up of plastics, it is then possible to achieve the zoom lens system according to the third aspect of the present invention at a much lower cost.

For the zoom lens systems according to the second and third aspects of the present invention, the powerless lens should preferably satisfy the following condition (14):

$$|f_t/f_{pwless}|<0.6 \qquad (14)$$

where $f_t$ is a focal length of the zoom lens system at a telephoto end thereof, and $f_{pwless}$ is a focal length of the powerless lens.

When there is a deviation from this range, the power of the lens becomes too strong, resulting in a severe performance drop due to environmental changes. When plastics is used for the lens, a large focus position shift due to environmental changes such as temperature or humidity changes occurs with a performance drop.

More preferably, the following condition (15) should be satisfied:

$$|f_t/f_{pwless}|<0.4 \qquad (15)$$

In particular, the surface shape of a plastic lens changes incidental to environmental changes. The surface shape change gives rise to a change in aberrations on the telephoto side of a high-power zoom lens system. As this change enlarges, there is an increasing influence on performance or focus position.

Accordingly, it is preferable that not only a paraxial portion of the lens but also a peripheral portion of the lens is powerless. In other words, the following condition (16) should preferably be satisfied:

$$|f_t/f(y)_{pwless}|<0.8 \qquad (16)$$

where ft is a focal length of the zoom lens system at a telephoto end thereof, and f(y) is a focal length of the peripheral portion of the lens. Here the focal length of the peripheral portion of the lens is defined by:

$$f(y)=1/\{(n-1)(1/r_F(y)-1/r_R(y))\}$$

where n is a d-line refractive index of the powerless lens, $r_F(y)$ is a radius of curvature of the powerless lens on the object side, and $r_R(y)$ is a radius of curvature of the powerless lens on the image side. However, it is to be noted that $r_F(y)$ and $r_R(y)$ are each defined as a paraxial radius of curvature in the case where the powerless lens has no aspherical effect, and as a radius of curvature by the following expression in the case where the powerless lens has aspherical effect. This expression represents the radius of curvature of the powerless lens at a point away from the optical axis, and can be derived from a system of simultaneous equations of an equation with respect to a circle whose center is positioned on the optical axis and an equation with respect to a surface normal at a height y.

$$r(y)=y(1+f'(y)^2)/f''(y)$$

where y is a height of an axial marginal ray at the telephoto end, and f(y) is a defining function with respect to an aspherical surface.

When the upper limit of 0.8 in condition (16) is exceeded, a large focus position shift occurs due to environmental changes such as temperature or humidity changes, resulting in a performance drop.

More preferably, the following condition (17) should be satisfied:

$$|f_t/f(y)_{pwless}|<0.6 \qquad (17)$$

In the zoom lens systems according to the first, second, and third aspects of the present invention, it is preferable that the focal length of the diffractive optical element should satisfy the following condition (18):

$$8<|f_G/f_{DOE}|<100 \qquad (18)$$

where $f_G$ is a focal length of a diffractive optical element-including zoom lens group, and $f_{DOE}$ is a focal length of the diffractive optical element.

When the upper limit of 100 in this condition is exceeded, the power of the diffractive surface becomes too weak, resulting in under-correction of chromatic aberrations. When the lower limit of 8 is not reached, the power of the diffractive surface becomes too strong, resulting in over-correction of chromatic aberrations.

More preferably, the following condition (19) should be satisfied:

$$10<|f_G/f_{DOE}|<70 \qquad (19)$$

In the zoom lens systems according to the second, and third aspects of the present invention, too, it is preferable that the following conditions (20) and (21) are satisfied as explained in conjunction with the zoom lens system according to the first aspect of the present invention:

$$50<v_{d1}<85 \qquad (20)$$

$$50<v_{d2}<85 \qquad (21)$$

where $v_{d1}$ is an Abbe's number of a lens having the largest positive refracting power in the first lens group, and $v_{d2}$ is an Abbe's number of a lens having the largest negative refracting power in the second lens group.

When the lower limit of 50 in these conditions is not reached, chromatic aberrations become worse with increasing secondary spectra. When the upper limit of 85 is exceeded, higher-order aberrations such as spherical aberration and coma are likely to occur. This is because all currently available vitreous materials have a low refractive index.

More preferably, the following conditions (22) and (23) should be satisfied:

$$55<v_{d1}<65 \qquad (22)$$

$$53<v_{d2}<65 \qquad (23)$$

In the zoom lens systems according to the second, and third aspects of the present invention, too, it is preferable that the following conditions (24) and (25) are satisfied as explained in conjunction with the zoom lens system according to the first aspect of the present invention:

$$0<d_{DOE}/f_1<0.3 \qquad (24)$$

$$50<v_{d1}<85 \qquad (25)$$

where $d_{DOE}$ is an axial separation from the aperture stop to the diffractive surface, $f_1$ is a focal length of the first lens group, and $v_{d1}$ is an Abbe's number of a lens having the largest positive refracting power in the first lens group.

When the upper limit of 0.3 in condition (24) is exceeded, considerable chromatic aberration of magnification is produced at the first lens group, and so it is impossible to achieve high performance all over the zooming spaces. At the lower limit of 0, the aperture stop collides with the lens. When the lower limit of 50 in condition (25) is not reached, chromatic aberrations become worse with increasing secondary spectra. When the upper limit of 85 is exceeded, higher-order aberrations such as spherical aberration and coma are likely to occur. This is because all currently available vitreous materials have a low refractive index.

More preferably, the following conditions (26) and (27) should be satisfied:

$$0.02<d_{DOE}/f_1<0.25 \qquad (26)$$

$$50<v_{d2}<85 \qquad (27)$$

In the zoom lens systems according to the second, and third aspects of the present invention, too, it is preferable that the following conditions (28) and (29) are satisfied as explained in conjunction with the zoom lens system according to the first aspect of the present invention.

$$0<|d_{DOE}'/f_2|<0.35 \qquad (28)$$

$$50<v_{d2}<85 \qquad (29)$$

where $d_{DOE}'$ is an axial separation from the final surface to the diffractive surface in the second lens group, $f_2$ is a focal length of the second lens group, and $v_{d2}$ is an Abbe's number of a lens having the largest negative refracting power in the second lens group.

When the upper limit of 0.35 in condition (28) is exceeded, considerable chromatic aberration of magnification is produced at the second lens group becomes large, and so it is impossible to achieve high performance all over the zooming spaces. When the lower limit of 50 in condition (29) is not reached, chromatic aberrations become worse with increasing secondary spectra. When the upper limit of 85 is exceeded, higher-order aberrations such as spherical aberration and coma are likely to occur. This is because all currently available vitreous materials have a low refractive index.

More preferably, the following conditions (30) and (31) are satisfied:

$$0<|d_{DOE}'/f_2|<0.27 \qquad (30)$$

$$53<v_{d2}<65 \qquad (31)$$

In the zoom lens systems according to the first, second, and third aspects of the present invention, it is preferable that one diffractive optical element is used in each zoom lens groups. This enables the amount of chromatic aberrations produced at each zoom lens group to be reduced as much as possible, and so makes it possible to obtain satisfactory performance ensuring prevention of deterioration in chromatic aberrations upon zooming.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1A:
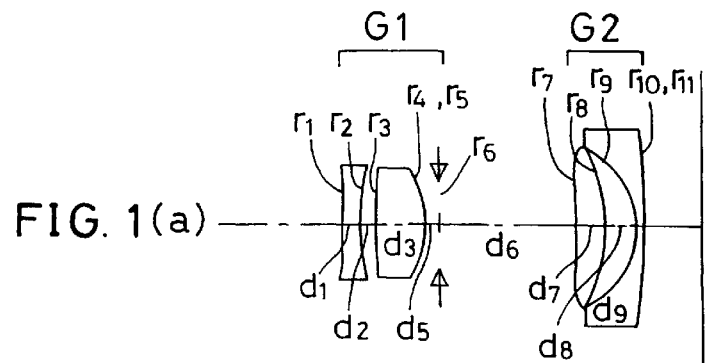
FIGS. 1(a), 1(b) and 1(c) are sectional schematics, taken along an optical axis, of Example 1 of the zoom lens system according to the present invention at a wide-angle end (a), a standard setting (b) and a telephoto end (c) thereof.
Figure 1B:
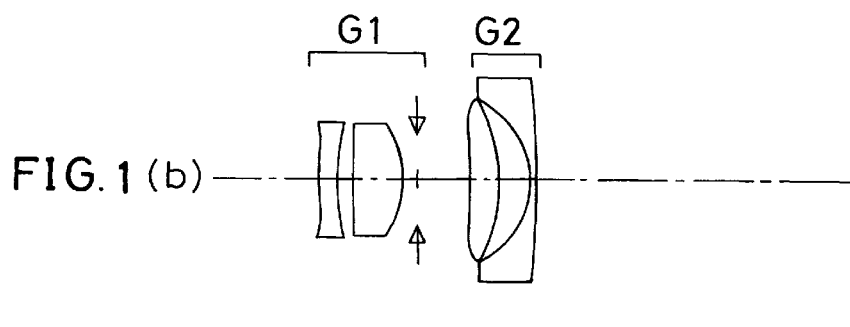
Figure 1C:
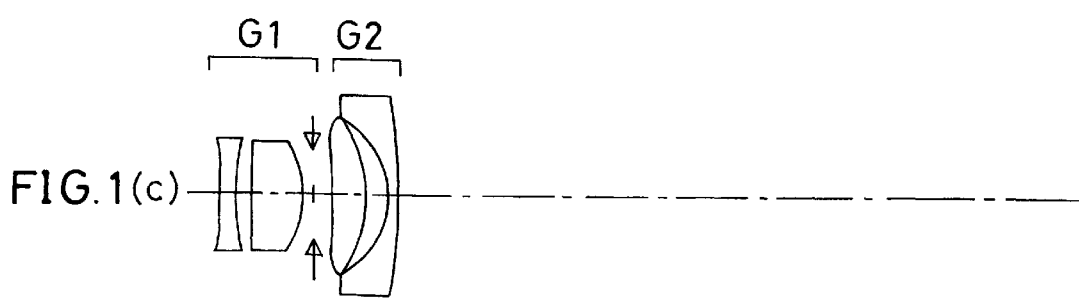

Set out below are Examples 1 to 9 of the zoom lens system according to the present invention.

A well-established Sweatt Model is known for how to design a zoom lens system with the diffractive optical element (DOE) used herein. This model is described in W. C. Sweatt, "NEW METHODS OF DESIGNING HOLOGRAPHIC ELEMENTS", SPIE, Vol. 125, Clever Optics, 46–53 (1997). In this design method, the DOE is thought as being a virtual refractive lens having an ultra-high refractive index (an ultra-high index lens). In the following examples, too, this method is used. In each example, the DOE was designed at 587.56 nm wavelength (d-line) with a virtual refractive index of 1001. The aspherical surface of the ultra-high index lens is defined below. Here let a Z-axis and a Y-axis be an optical axis direction and a direction perpendicular to the optical axis, respectively. Then, the aspherical surface is given by $$Z = CY^2/[1+\sqrt{\{1-(1+K)C^2Y^2\}}] + A_4Y^4 + A_6Y^6 + A_8Y^8 + A_{10}Y^{10} + \quad (a)$$

where C is curvature at a surface apex (=1/r where r is a radius of curvature), K is a conical coefficient, and $A_4$, $A_6$, $A_8$, and $A_{10}$ are fourth, sixth, eighth, and tenth aspherical coefficients, respectively.

The surface coming in contact with the diffractive surface at null thickness is a surface of a substrate material. Actually, the diffractive surface is fabricated on the surface of the substrate material using a phase change found from a difference between the aspherical shape of the diffractive surface and the surface shape of the material, and the indices of refraction, and converting the phase change to a diffraction grating pitch. In other words, it is the surface of the substrate material which has final lens action in each of the examples given later. In this regard, it is to be noted that an aspherical surface defined by an ultra-high index refractive lens and here called the diffractive surface does not actually exist. In the lens section corresponding to each example, however, surface Nos. denoting the diffractive surfaces in the numerical data are shown in terms of $r_5$, $r_{11}$, etc.

Some exemplary sectional shapes of the diffractive surface are shown in FIG. 15. Shown in FIG. 15(a) is a diffractive surface called an amplitude-modulated type wherein an alternate arrangement of transparent and opaque portions 21 and 22 is provided, with the thickness of each opaque portion 22 being substantially zero. Shown in FIG. 15(b) is an alternate arrangement of high- and low-refractive index portions 23 and 24, to which diffraction is imparted through a phase difference due to a refractive index difference. Shown in FIG. 15(c) is an alternate arrangement of rectangular asperities, to which diffraction is imparted through a phase difference due to a thickness difference. This arrangement is also called a 2-level binary element. Shown in FIG. 15(d) is a kinoform arrangement having a sawtoothed surface, to which diffraction is imparted by a phase difference due to a continuous thickness difference. FIGS. 15(e) and 15(f) are illustrative of binary elements to 4-, and 8-level approximation of kinoform (see FIG. 3). Thus, some diffractive surface shapes are available. In the practice of the present invention, however, it is preferable to use the kinoform of FIG. 15(d), and the 4-, or more level binary elements of FIGS. 15(e) and 15(f) so that the diffraction efficiency can be increased to make full use of the quantity of light.

FIGS. 1 to 9 are sectional schematics of Examples 1 to 9 of the zoom lens system according to the present invention, as taken along an optical axis thereof. More specifically, FIGS. 1(a), 1(b) and 1(c) are sectional representations of Example 1 at a wide-angle end (a), a standard setting (b) and a telephoto end (c) thereof, as taken along the optical axis. FIGS. 2 to 9 are sectional representations of Examples 2 to 9, each at a wide-angle end, as taken along the optical axis.

Examples 1 to 9 are each directed to a zooming lens system comprising a first lens group G1 having positive power and a second lens group G2 having negative power. With zooming from the wide-angle end to the telephoto end, the lens groups move toward an object side of the system while the spacing between them becomes narrow. In each example, focusing occurs by moving the first lens group G1 toward the object side.

Example 1 is directed to a two-group zoom lens system consisting of four lenses and using diffractive surfaces. As shown in FIG. 1, the zoom lens system is constructed of, in order from an object side thereof, a first lens group G1 consisting of a first negative meniscus lens convex on the object side and a second double-convex positive lens with an aperture stop located on an image side of the system, and a second lens group G2 consisting of a third positive meniscus lens convex on the image side and a fourth negative meniscus lens convex on the image side. Two diffractive surfaces are fabricated, one on the surface of the second lens located on the image side and another on the surface of the fourth lens located on the image side. Four aspherical surfaces are formed, two on both surfaces of the first lens and two on both surfaces of the third lens.

Figure 2:
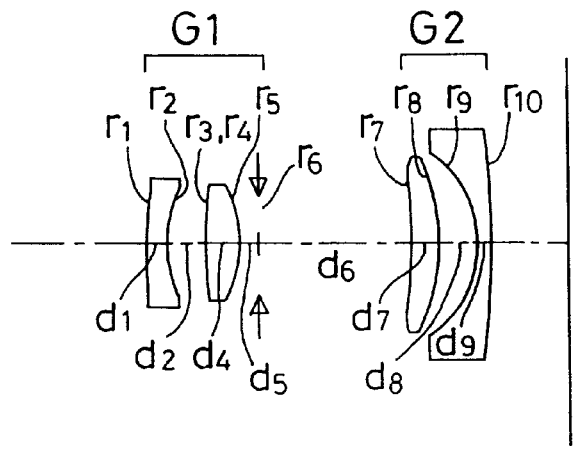
FIG. 2 is a sectional schematic of Example 2 of the zoom lens system according to the present invention at a wide-angle end thereof, as taken along an optical axis thereof.

Example 2 is directed to a two-group zoom lens system consisting of four lenses and using a diffractive surface. As shown in FIG. 2, the zoom lens system is constructed of, in order from an object side thereof, a first lens group G1 consisting of a first negative meniscus lens convex on the object side and a second double-convex positive lens with an aperture stop located on an image side of the system, and a second lens group G2 consisting of a third positive meniscus lens convex on the image side and a fourth negative meniscus lens convex on the image side. One diffractive surface is fabricated on the surface of the second lens located on the object side. Four aspherical surfaces are used, two on both surface of the first lens and two on both surfaces of the third lens.

Figure 3:
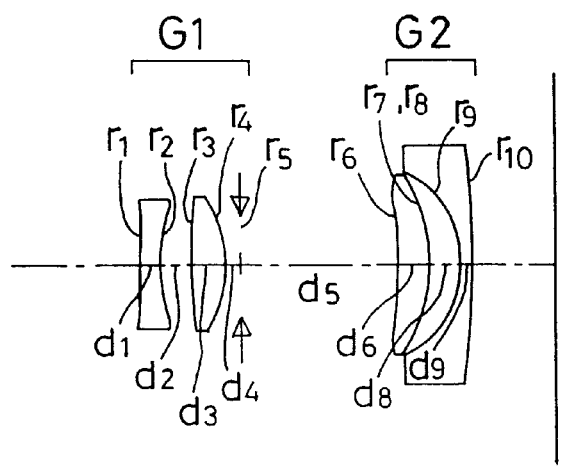
FIG. 3 is a sectional schematic of Example 3 of the zoom lens system according to the present invention at a wide-angle end, as taken along an optical axis thereof.
Figure 4:
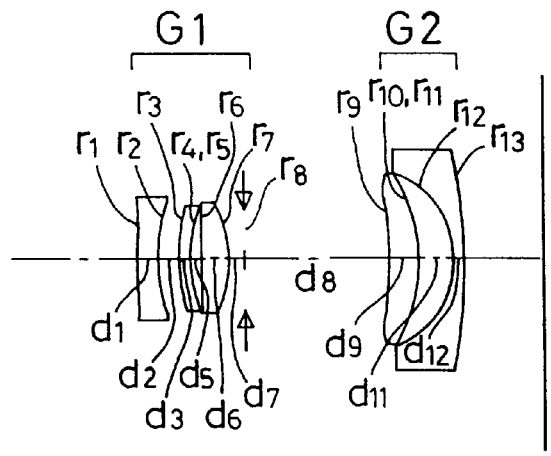
FIG. 4 is a sectional schematic of Example 4 of the zoom lens system according to the present invention at a wide-angle end thereof, as taken along an optical axis thereof.

Example 3 is directed to a two-group zoom lens system consisting of four lenses and using a diffractive surface. As shown in FIG. 3, the zoom lens system is constructed of, in order from an object side thereof, a first lens group G1 consisting of a first negative meniscus lens convex on the object side and a second double-convex positive lens with an aperture stop located on an image side of the system, and a second lens group G2 consisting of a third positive meniscus lens convex on the image side and a fourth negative meniscus lens convex on the image side. A diffractive surface is fabricated on the surface of the third lens located on the image side. Four aspherical surfaces are used, two on both surfaces of the first lens and two on both surfaces of the third lens. At the surface of the third lens located on the image side, a diffractive surface is fabricated on an aspherical surface substrate. In Example 3, the third lens is made up of a polyolefinic resin of low hygroscopicity with respect to humidity changes.

Example 4 is directed to a two-group zoom lens system consisting of five lenses and using a diffractive surface. As shown in FIG. r, the zoom lens system is constructed of, in order from an object side thereof, a first lens group G1 consisting of a first negative meniscus lens convex on the object side, a second powerless lens convex on the object side and a third double-convex positive lens with an aperture stop located on an image side of the system, and a second lens group G2 consisting of a fourth positive meniscus lens convex on the image side and a fifth negative meniscus lens convex on the image side. Two diffractive surfaces are fabricated, one on the surface of the third lens located on the image side and another on the surface of the fourth lens located on the image side. Four aspherical surfaces are used, two on both surfaces of the first lens and two on both surfaces of the fourth lens. At the surface of the fourth lens located on the image side, a diffractive surface is fabricated on an aspherical surface substrate. In Example 3, the second and fourth lenses are each made up of a polyolefinic resin of low hygroscopicity with respect to humidity changes.

Figure 5:
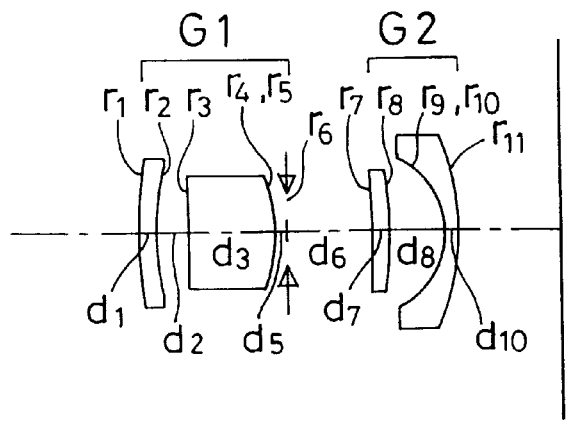
FIG. 5 is a sectional schematic of Example 5 of the zoom lens system according to the present invention at a wide-angle end, as taken along an optical axis thereof.

Example 5 is directed to a zoom lens system consisting of four lenses inclusive of powerless lenses and using diffractive surfaces. As shown in FIG. 5, the zoom lens system is constructed of, in order from an object side thereof, a first lens group G1 consisting of a first powerless lens convex on the object side and a second double-convex positive lens with an aperture stop located on an image side of the system, and a second lens group G2 consisting of a third powerless lens convex on the image side and a fourth negative meniscus lens convex on the image side. Two diffractive surfaces are fabricated, one on the surface of the second lens located on the image side and another on the surface of the fourth lens located on the object side. Four aspherical surfaces are formed, two on both surfaces of the first lens and two on both surfaces of the third lens. The first and third lenses are each formed of an acrylic resin.

Figure 6:
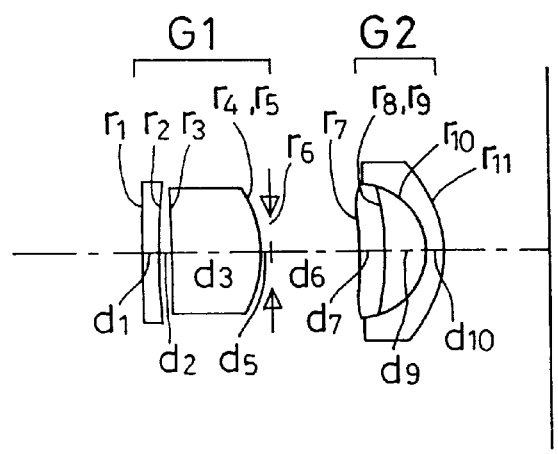
FIG. 6 is a sectional schematic of Example 6 of the zoom lens system according to the present invention at a wide-angle end thereof, as taken along an optical axis thereof.

Example 6 is directed to a zoom lens system consisting of four lenses inclusive of powerless lenses and using diffractive surfaces. As shown in FIG. 6, the zoom lens system is constructed of, in order from an object side thereof, a first lens group G1 consisting of a first powerless lens convex on the object side and a second positive meniscus lens with an aperture stop located on an image side of the system, and a second lens group G2 consisting of a third powerless lens convex on the image side and a fourth negative meniscus lens convex on the image side. Two diffractive surfaces are fabricated, one on the surface of the second lens located on the image side and another on the surface of the fourth lens located on the image side. Four aspherical surfaces are formed, two on both surfaces of the first lens and two on both surfaces of the third lens. At the surface of the third lens located on the image side, a diffractive surface is fabricated on an aspherical surface substrate. The first and third lenses are each formed of an acrylic resin.

Figure 7:
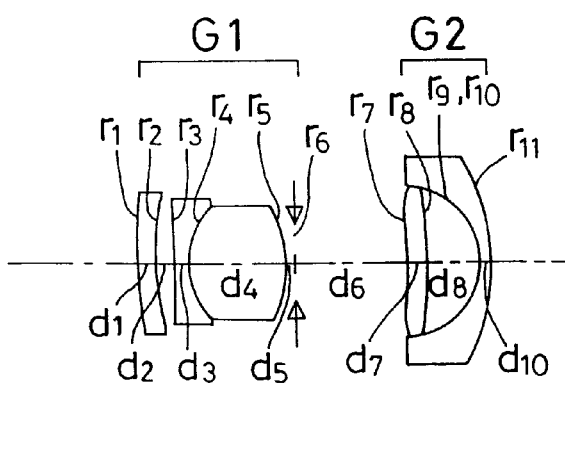
FIG. 7 is a sectional schematic of Example 7 of the zoom lens system according to the present invention at a wide-angle end, as taken along an optical axis thereof.

Example 7 is directed to a zoom lens system consisting of five lenses inclusive of powerless lenses and using a diffractive surface. As shown in FIG. 7, the zoom lens system is constructed of, in order from an object side thereof, a first lens group G1 consisting of a first powerless lens convex on the object side and a doublet made up of a second double-concave negative lens and a third double-convex positive lens with an aperture stop located on an image side of the system, and a second lens group G2 consisting of a fourth powerless lens convex on the image side and a fifth negative meniscus lens convex on the image side. A diffractive surface is fabricated on the surface of the fifth lens located on the object side. Four aspherical surfaces are formed, two on both surfaces of the first lens and two on both surfaces of the fourth lens. The first and fourth lenses are each formed of an acrylic resin.

Figure 8:
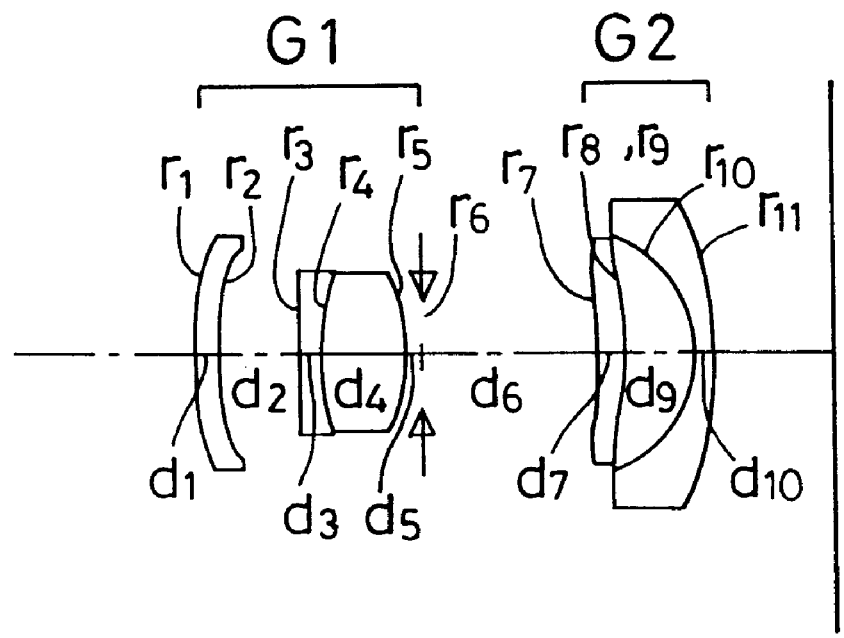
FIG. 8 is a sectional schematic of Example 8 of the zoom lens system according to the present invention at a wide-angle end thereof, as taken along an optical axis thereof.

Example 8 is directed to a zoom lens system consisting of five lenses inclusive of powerless lenses and using a diffractive surface. As shown in FIG. 8, the zoom lens system is constructed of, in order from an object side thereof, a first lens group G1 consisting of a first powerless lens convex on the object side and a doublet made up of a second negative meniscus lens on the convex on the object side and a third double-convex positive lens with an aperture stop located on an image side of the system, and a second lens group G2 consisting of a fourth powerless lens convex on the image side and a fifth negative meniscus lens convex on the image side. A diffractive surface is fabricated on the surface of the fourth lens located on the image side. Four aspherical surfaces are formed, two on both surfaces of the first lens and two on both surfaces of the fourth lens. At the surface of the fourth lens located on the image side, a diffractive surface is fabricated on an aspherical surface substrate. The first and fourth lenses are each formed of an acrylic resin.

Figure 9:
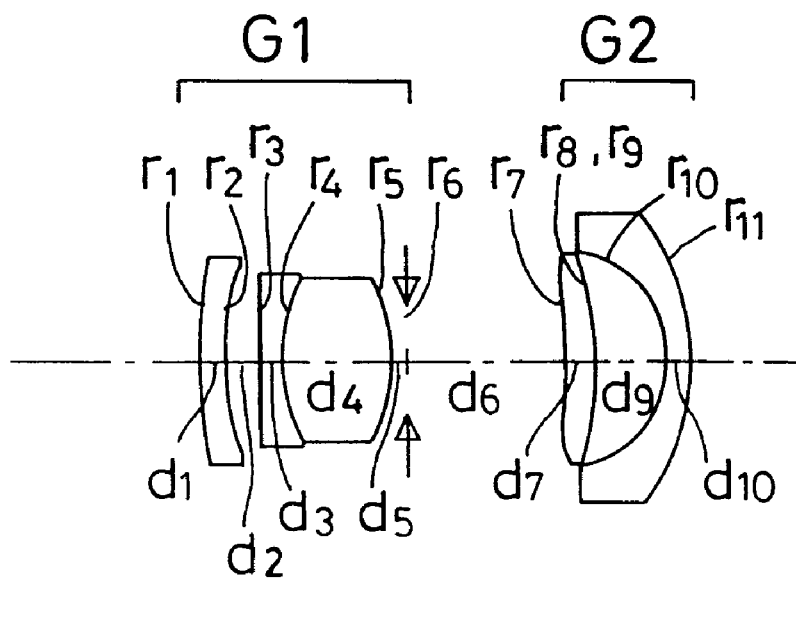
FIG. 9 is a sectional schematic of Example 9 of the zoom lens system according to the present invention at a wide-angle end, as taken along an optical axis thereof.
Figure 10A:
FIGS. 10(a), 10(b), 10(c) and 10(d) are aberration diagrams for Examples 1 at the wide-angle end.
Figure 10B:
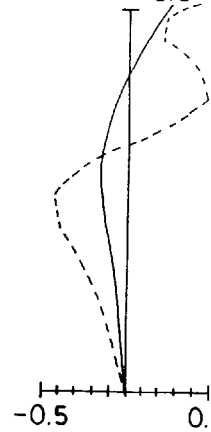
Figure 10C:
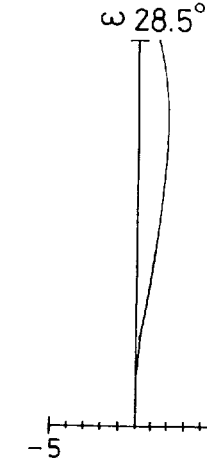
Figure 10D:
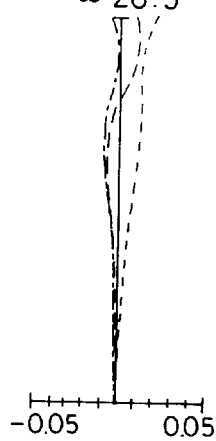
Figure 11A:
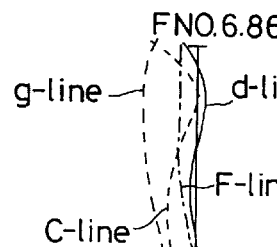
FIGS. 11(a), 11(b), 11(c) and 11(d) are aberration diagrams for Example 1 at the standard setting.
Figure 11B:
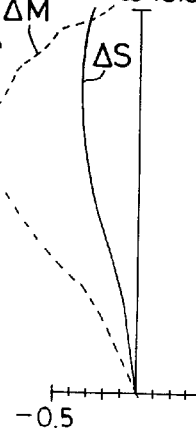
Figure 11C:
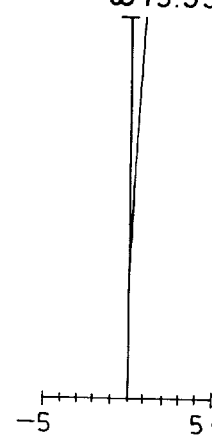
Figure 11D:
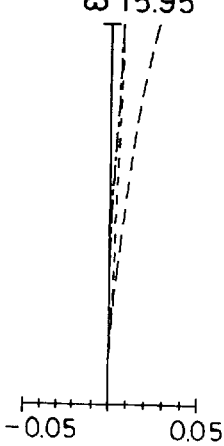
Figure 12A:
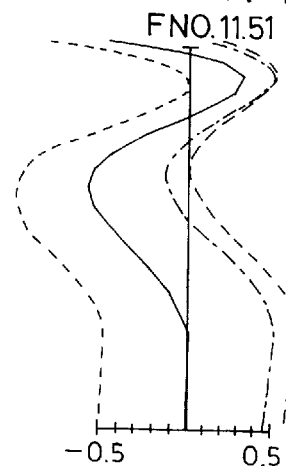
FIGS. 12(a), 12(b), 12(c) and 12(d) are aberration diagrams for Example 1 at the telephoto end.
Figure 12B:
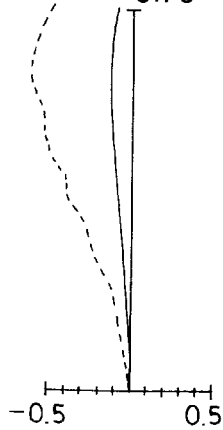
Figure 12C:
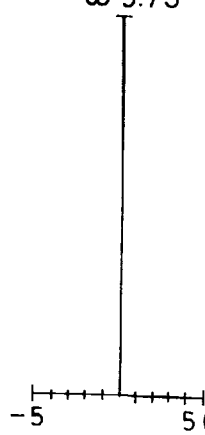
Figure 12D:
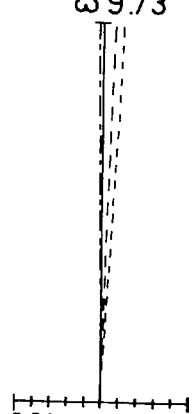
Figure 13:
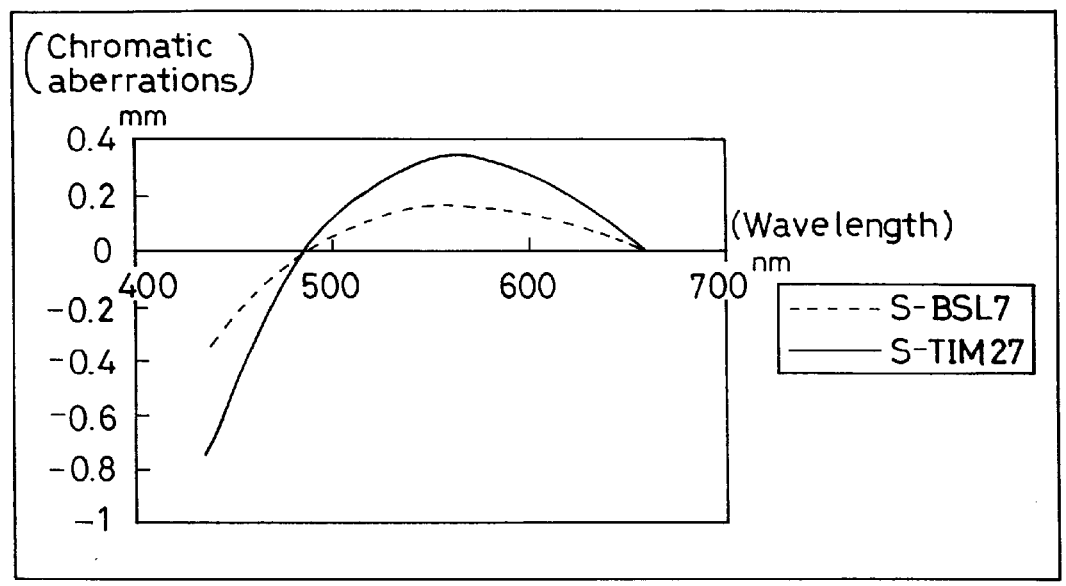
FIG. 13 is a graphical representation of remnant chromatic aberrations when the diffractive optical element is used.
Figure 14:
FIG. 14 is a sectional view of one exemplary structure of the diffractive optical element.
Figure 15A:
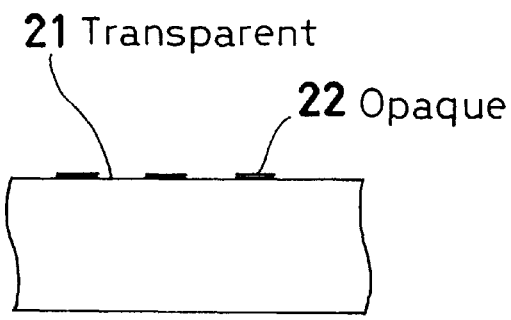
FIGS. 15(a), 15(b), 15(c), 15(d), 15(e) and 15(f) are sectional views of some illustrative shapes of the diffractive surface.
Figure 15B:
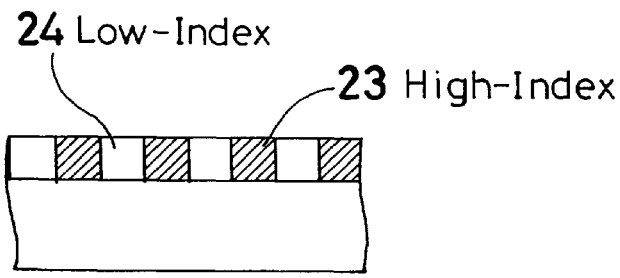
Figure 15C:
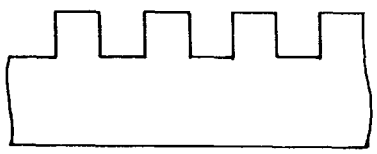
Figure 15D:
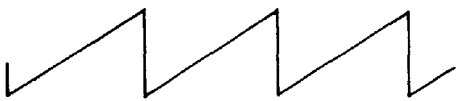
Figure 15E:
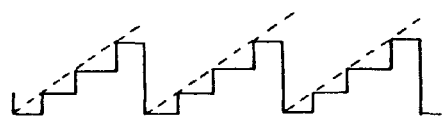
Figure 15F:

Example 9 is directed to a zoom lens system consisting of five lenses inclusive of powerless lenses and using a diffractive surface. As shown in FIG. 9, the zoom lens system is constructed of, in order from an object side thereof, a first lens group G1 consisting of a first powerless lens convex on the object side and a doublet made up of a second double-concave negative lens and a third double-convex positive lens with an aperture stop located on an image side of the system, and a second lens group G2 consisting of a fourth powerless lens convex on the image side and a fifth negative meniscus lens convex on the image side. A diffractive surface is fabricated on the surface of the fourth lens located on the image side. Two aspherical surfaces are formed, one on the surface of the first lens located on the image side and another on the surface of the fourth lens located on the image side. The first and fourth lenses are each formed of an acrylic resin.

For the plastics in the examples mentioned above, either the acrylic resin or the polyolefinic resin of low hygroscopicity with respect to humidity changes may be used. In the examples with diffracted surfaces fabricated on glass surfaces, the diffractive surfaces may be formed either directly on the glass surfaces by means of molding, etc., or on resins, etc. formed on the glass surfaces.

Enumerated below are numerical data regarding Examples 1 to 9. Symbols used hereinafter but not hereinbefore have the following meanings:

f . . . focal length, $F_{NO}$ . . . F-number,

ω . . . half angle of view, $f_B$ . . . back focus, $r_1, r_2, \ldots$ radius of curvature of each lens surface, $d_1, d_2, \ldots$ spacing between adjacent lens surfaces, $n_{d1}, nd_2, \ldots$ d-line refractive index of each lens, and $\nu_{d1}, \nu_{d2}, \ldots$ d-line Abbe's number of each lens.

The aspherical shape is given by the aforesaid (a). In what follows, "Dif.sur." represents a diffractive surface.

EXAMPLE 1 f = 39.36 ~ 75.00 ~ 125.89
$F_{NO}$ = 3.60 ~ 6.86 ~ 11.51
ω = 28.50° ~ 15.95° ~ 9.73°
$f_B$ = 8.50 ~ 41.83 ~ 89.44

| | | | |
|---|---|---|---|
| $r_1$ = 34.43778 (Aspheric) | $d_1$ = 2.34531 | $n_{d1}$ = 1.76200 | $\nu_{d1}$ = 40.10 |
| $r_2$ = 17.75170 (Aspheric) | $d_2$ = 1.87953 | | |
| $r_3$ = 131.82540 | $d_3$ = 6.68204 | $n_{d2}$ = 1.56384 | $\nu_{d2}$ = 60.67 |
| $r_4$ = −13.01744 | $d_4$ = 0.00000 | $n_{d3}$ = 1001.00 | $\nu_{d3}$ = −3.45 |
| $r_5$ = −13.01724 (Dif. sur.) | $d_5$ = 1.70000 | | |
| $r_6$ = ∞(Stop) | $d_6$ = (Variable) | | |
| $r_7$ = −83.31846 (Aspheric) | $d_7$ = 4.09863 | $n_{d4}$ = 1.51633 | $\nu_{d4}$ = 64.14 |
| $r_8$ = −23.16017 (Aspheric) | $d_8$ = 3.49462 | | |
| $r_9$ = −11.73680 | $d_9$ = 1.00000 | $n_{d5}$ = 1.69680 | $\nu_{d5}$ = 55.53 |

EXAMPLE 1-continued

| | | | |
|---|---|---|---|
| $r_{10}$ = −95.27607 | $d_{10}$ = 0.00000 | $n_{d6}$ = 1001.00 | $\nu_{d6}$ = −3.45 |
| $r_{11}$ = −95.28930 (Dif. sur.) | | | |

Zooming Spaces

| f | 39.36 | 75.00 | 125.89 |
|---|---|---|---|
| $d_6$ | 17.68931 | 6.98100 | 2.20000 |

Aspherical Coefficients

1st surface

K = 0
$A_4$ = −2.93456 × $10^{-4}$
$A_6$ = −2.01608 × $10^{-6}$
$A_8$ = 2.29935 × $10^{-8}$
$A_{10}$ = 1.76308 × $10^{-11}$
$A_{12}$ = −1.53840 × $10^{-12}$
$A_{14}$ = 0

2nd surface

K = 0
$A_4$ = −2.58599 × $10^{-4}$
$A_6$ = −1.73858 × $10^{-6}$
$A_8$ = 5.45977 × $10^{-8}$
$A_{10}$ = −3.90060 × $10^{-10}$
$A_{12}$ = 1.55649 × $10^{-12}$
$A_{14}$ = 0

5th surface

K = 0
$A_4$ = 3.97545 × $10^{-9}$
$A_6$ = −3.35484 × $10^{-11}$
$A_8$ = 4.35752 × $10^{-12}$
$A_{10}$ = −1.18204 × $10^{-13}$
$A_{12}$ = 7.32890 × $10^{-16}$
$A_{14}$ = 0

7th surface

K = 0
$A_4$ = 4.79239 × $10^{-5}$
$A_6$ = 1.65566 × $10^{-6}$
$A_8$ = −8.95464 × $10^{-8}$
$A_{10}$ = 1.75080 × $10^{-9}$
$A_{12}$ = −1.48472 × $10^{-11}$
$A_{14}$ = 4.89661 × $10^{-14}$

8th surface

K = 0
$A_4$ = −5.75669 × $10^{-6}$
$A_6$ = 1.53306 × $10^{-6}$
$A_8$ = −9.35844 × $10^{-8}$
$A_{10}$ = 1.73099 × $10^{-9}$
$A_{12}$ = −1.43680 × $10^{-11}$
$A_{14}$ = 4.65373 × $10^{-14}$

EXAMPLE 2 f = 39.35 ~ 75.03 ~ 126.13
$F_{NO}$ = 3.60 ~ 6.87 ~ 11.54
ω = 28.06° ~ 15.92° ~ 9.70°
$f_B$ = 8.50 ~ 40.53 ~ 86.40

| | | | |
|---|---|---|---|
| $r_1$ = 19.23881 (Aspheric) | $d_1$ = 2.50000 | $n_{d1}$ = 1.74950 | $\nu_{d1}$ = 35.28 |
| $r_2$ = 11.99789 (Aspheric) | $d_2$ = 4.02698 | | |
| $r_3$ = 67.87361 (Dif. sur.) | $d_3$ = 0.00000 | $n_{d2}$ = 1001.00 | $\nu_{d2}$ = −3.45 |
| $r_4$ = 67.87657 | $d_4$ = 4.09637 | $n_{d3}$ = 1.51633 | $\nu_{d3}$ = 64.14 |
| $r_5$ = −12.29798 | $d_5$ = 1.70000 | | |
| $r_6$ = ∞ (Stop) | $d_6$ = (Variable) | | |
| $r_7$ = −73.23200 (Aspheric) | $d_7$ = 3.20000 | $n_{d4}$ = 1.58144 | $\nu_{d4}$ = 40.75 |
| $r_8$ = −26.11312 (Aspheric) | $d_8$ = 4.23647 | | |
| $r_9$ = −11.96875 | $d_9$ = 1.00000 | $n_{d5}$ = 1.72916 | $\nu_{d5}$ = 54.68 |
| $r_{10}$ = −103.16767 | | | |

EXAMPLE 2-continued

Zooming Spaces

| f | 39.35 | 75.03 | 126.13 |
|---|---|---|---|
| $d_6$ | 16.81796 | 6.71325 | 2.20000 |

Aspherical Coefficients

1st surface $K = 0$
$A_4 = -2.92522 \times 10^{-4}$
$A_6 = -2.40451 \times 10^{-5}$
$A_8 = 2.37816 \times 10^{-8}$
$A_{10} = -1.57985 \times 10^{-10}$
$A_{12} = 1.33926 \times 10^{-13}$
$A_{14} = 0$ 2nd surface $K = 0$
$A_4 = -3.08410 \times 10^{-4}$
$A_6 = -2.14845 \times 10^{-6}$
$A_8 = 2.75231 \times 10^{-8}$
$A_{10} = 2.47003 \times 10^{-10}$
$A_{12} = -3.16403 \times 10^{-12}$
$A_{14} = 0$ 3rd surface $K = -6.32241 \times 10^{-3}$
$A_4 = -4.71686 \times 10^{-9}$
$A_6 = 3.42810 \times 10^{-10}$
$A_8 = -9.66991 \times 10^{-12}$
$A_{10} = 1.06266 \times 10^{-13}$
$A_{12} = 0$
$A_{14} = 0$ 7th surface $K = 2.89020 \times 10^{+1}$
$A_4 = 4.34134 \times 10^{-5}$
$A_6 = 7.93558 \times 10^{-7}$
$A_8 = -5.85701 \times 10^{-8}$
$A_{10} = 1.40223 \times 10^{-9}$
$A_{12} = -1.40884 \times 10^{-11}$
$A_{14} = 5.34936 \times 10^{-14}$ 8th surface $K = 0$
$A_4 = -3.49699 \times 10^{-5}$
$A_6 = 1.98882 \times 10^{-6}$
$A_8 = -9.60916 \times 10^{-8}$
$A_{10} = 1.83104 \times 10^{-9}$
$A_{12} = -1.61211 \times 10^{-11}$
$A_{14} = 5.48017 \times 10^{-14}$

EXAMPLE 3

$f = 39.34 \sim 75.00 \sim 126.05$
$F_{NO} = 3.65 \sim 6.96 \sim 11.69$
$\omega = 28.18° \sim 15.95° \sim 9.72°$
$f_B = 8.50 \sim 41.74 \sim 89.33$

| | | | |
|---|---|---|---|
| $r_1 = 26.41476$ (Aspheric) | $d_1 = 2.50000$ | $n_{d1} = 1.76182$ | $\nu_{d1} = 26.52$ |
| $r_2 = 15.01391$ (Aspheric) | $d_2 = 3.48230$ | | |
| $r_3 = 113.23865$ | $d_3 = 3.74298$ | $n_{d2} = 1.56883$ | $\nu_{d2} = 56.36$ |
| $r_4 = -12.68605$ | $d_4 = 1.70000$ | | |
| $r_5 = \infty$ (Stop) | $d_5 = $ (Variable) | | |
| $r_6 = -46.65734$ (Aspheric) | $d_6 = 3.20000$ | $n_{d3} = 1.52542$ | $\nu_{d3} = 55.78$ |
| $r_7 = -21.98569$ (Aspheric) | $d_7 = 0.00000$ | $n_{d4} = 1001.00$ | $\nu_{d4} = -3.45$ |
| $r_8 = -21.98589$ (Dif. sur.) | $d_8 = 4.08749$ | | |
| $r_9 = -11.23818$ | $d_9 = 1.0000$ | $n_{d5} = 1.64850$ | $\nu_{d5} = 53.02$ |
| $r_{10} = -82.28860$ | | | |

EXAMPLE 3-continued

Zooming Spaces

| f | 39.34 | 75.00 | 126.05 |
|---|---|---|---|
| $d_5$ | 17.15925 | 6.81990 | 2.2000 |

Aspherical Coefficients

1st surface $K = 0$
$A_4 = -3.00588 \times 10^{-4}$
$A_6 = -2.41492 \times 10^{-6}$
$A_8 = 2.90371 \times 10^{-8}$
$A_{10} = -2.19237 \times 10^{-10}$
$A_{12} = 4.57978 \times 10^{-15}$
$A_{14} = 0$ 2nd surface $K = 0$
$A_4 = -2.71630 \times 10^{-4}$
$A_6 = -2.35047 \times 10^{-6}$
$A_8 = 4.79973 \times 10^{-8}$
$A_{10} = 2.03907 \times 10^{-11}$
$A_{12} = -3.91188 \times 10^{-12}$
$A_{14} = 0$ 6th surface $K = -2.36191$
$A_4 = 6.49006 \times 10^{-5}$
$A_6 = 2.93084 \times 10^{-7}$
$A_8 = -5.42190 \times 10^{-8}$
$A_{10} = 1.39535 \times 10^{-9}$
$A_{12} = -1.39629 \times 10^{-11}$
$A_{14} = 5.26702 \times 10^{-14}$ 7th surface $K = 0$
$A_4 = -2.31838 \times 10^{-5}$
$A_6 = 1.66119 \times 10^{-6}$
$A_8 = -9.16370 \times 10^{-8}$
$A_{10} = 1.80390 \times 10^{-9}$
$A_{12} = -1.60926 \times 10^{-11}$
$A_{14} = 5.56519 \times 10^{-14}$ 8th surface $K = 0$
$A_4 = -2.31763 \times 10^{-5}$
$A_6 = 1.66113 \times 10^{-6}$
$A_8 = -9.16378 \times 10^{-8}$
$A_{10} = 1.80390 \times 10^{-9}$
$A_{12} = -1.60926 \times 10^{-11}$
$A_{14} = 5.56512 \times 10^{-14}$

EXAMPLE 4

$f = 39.34 \sim 74.99 \sim 126.06$
$F_{NO} = 3.60 \sim 6.86 \sim 11.54$
$\omega = 28.01° \sim 15.91° \sim 9.70°$
$f_B = 8.50 \sim 40.14 \sim 85.47$

| | | | |
|---|---|---|---|
| $r_1 = 24.93378$ (Aspheric) | $d_1 = 2.50000$ | $n_{d1} = 1.74950$ | $\nu_{d1} = 35.28$ |
| $r_2 = 14.52044$ (Aspheric) | $d_2 = 2.13251$ | | |
| $r_3 = 23.68137$ | $d_3 = 1.50000$ | $n_{d2} = 1.52542$ | $\nu_{d2} = 55.78$ |
| $r_4 = 23.68911$ | $d_4 = 0.00000$ | $n_{d3} = 1001.00$ | $\nu_{d3} = -3.45$ |
| $r_5 = 23.68975$ (Dif. sur.) | $d_5 = 1.00000$ | | |
| $r_6 = 79.31825$ | $d_6 = 3.19253$ | $n_{d4} = 1.56384$ | $\nu_{d4} = 60.67$ |
| $r_7 = -13.08680$ | $d_7 = 1.70000$ | | |
| $r_8 = \infty$ (Stop) | $d_8 = $ (Variable) | | |
| $r_9 = -46.28467$ (Aspheric) | $d_8 = 3.20000$ | $n_{d5} = 1.52542$ | $\nu_{d5} = 55.78$ |
| $r_{10} = -21.90258$ (Aspheric) | $d_{10} = 0.00000$ | $n_{d6} = 1001.00$ | $\nu_{d6} = -3.45$ |
| $r_{11} = -21.90309$ (Dif. sur.) | $d_{11} = 4.12375$ | | |
| $r_{12} = -10.84945$ | $d_{12} = 1.00000$ | $n_{d7} = 1.69680$ | $\nu_{d7} = 55.53$ |
| $r_{13} = -56.22159$ | | | |

EXAMPLE 4-continued

Zooming Spaces

| f | 39.34 | 74.99 | 126.06 |
|---|---|---|---|
| $d_8$ | 15.85172 | 6.41790 | 2.20000 |

Aspherical Coefficients

1st surface $K = 0$
$A_4 = -2.89831 \times 10^{-4}$
$A_6 = -2.22516 \times 10^{-6}$
$A_8 = 2.48012 \times 10^{-8}$
$A_{10} = -1.00512 \times 10^{-10}$
$A_{12} = -5.26201 \times 10^{-13}$
$A_{14} = 0$ 2nd surface $K = 0$
$A_4 = -2.80786 \times 10^{-4}$
$A_6 = -2.06248 \times 10^{-6}$
$A_8 = 4.0618 \times 10^{-8}$
$A_{10} = 9.62828 \times 10^{-11}$
$A_{12} = -3.81457 \times 10^{-12}$
$A_{14} = 0$ 5th surface $K = 0$
$A_4 = 4.95144 \times 10^{-9}$
$A_6 = -2.35989 \times 10^{-10}$
$A_8 = 8.84465 \times 10^{-12}$
$A_{10} = -1.11437 \times 10^{-13}$
$A_{12} = 0$
$A_{14} = 0$ 9th surface $K = 6.08860$
$A_4 = 6.91205 \times 10^{-5}$
$A_6 = 4.14044 \times 10^{-8}$
$A_8 = -5.08179 \times 10^{-8}$
$A_{10} = 1.35899 \times 10^{-9}$
$A_{12} = -1.38032 \times 10^{-11}$
$A_{14} = 5.27927 \times 10^{-14}$ 10th surface $K = 0$
$A_4 = -2.31922 \times 10^{-5}$
$A_6 = 1.66104 \times 10^{-6}$
$A_8 = -9.16356 \times 10^{-8}$
$A_{10} = 1.80389 \times 10^{-8}$
$A_{12} = -1.60924 \times 10^{-11}$
$A_{14} = 5.56586 \times 10^{-14}$ 11th surface $K = 0$
$A_4 = -2.31925 \times 10^{-5}$
$A_6 = 1.66111 \times 10^{-6}$
$A_8 = -9.16395 \times 10^{-8}$
$A_{10} = 1.80393 \times 10^{-9}$
$A_{12} = -1.60924 \times 10^{-11}$
$A_{14} = 5.56572 \times 10^{-14}$

EXAMPLE 5

$f = 39.33 \sim 51.54 \sim 67.55$
$F_{NO} = 4.66 \sim 6.10 \sim 8.00$
$\omega = 28.04° \sim 22.49° \sim 17.68°$
$f_B = 10.86 \sim 22.64 \sim 38.09$

| | | | |
|---|---|---|---|
| $r_1 = 56.50291$ (Aspheric) | $d_1 = 2.00000$ | $n_{d1} = 1.49241$ | $\nu_{d1} = 57.66$ |
| $r_2 = 61.74751$ (Aspheric) | $d_2 = 3.54490$ | | |
| $r_3 = 1526.90884$ | $d_3 = 10.05703$ | $n_{d2} = 1.51633$ | $\nu_{d2} = 64.14$ |
| $r_4 = -14.47316$ | $d_4 = 0.00000$ | $n_{d3} = 1001.00$ | $\nu_{d3} = -3.45$ |
| $r_5 = -14.47267$ (Dif. sur.) | $d_5 = 1.00000$ | | |

EXAMPLE 5-continued

| | | | |
|---|---|---|---|
| $r_6 = \infty$ (Stop) | $d_6 = $ (Variable) | | |
| $r_7 = -39.63888$ (Aspheric) | $d_7 = 2.00000$ | $n_{d4} = 1.49241$ | $\nu_{d4} = 57.66$ |
| $r_8 = -39.66031$ (Aspheric) | $d_8 = 6.10610$ | | |
| $r_9 = -8.66745$ (Dif. sur) | $d_9 = 0.00000$ | $n_{d5} = 1001.00$ | $\nu_{d5} = -3.45$ |
| $r_{10} = -8.66761$ | $d_{10} = 1.50000$ | $n_{d6} = 1.51633$ | $\nu_{d6} = 64.14$ |
| $r_{11} = -24.55864$ | | | |

Zooming Spaces

| f | 39.33 | 51.54 | 67.55 |
|---|---|---|---|
| $d_6$ | 9.66639 | 5.71589 | 2.70000 |

Aspherical Coefficients

1st surface $K = -1.88590 \times 10^{+1}$
$A_4 = -5.26777 \times 10^{-6}$
$A_6 = 2.22726 \times 10^{-7}$
$A_8 = 8.86103 \times 10^{-10}$
$A_{10} = -3.34550 \times 10^{-11}$
$A_{12} = 0$
$A_{14} = 0$ 2nd surface $K = 5.08470 \times 10^{+1}$
$A_4 = 5.74343 \times 10^{-5}$
$A_6 = 2.27456 \times 10^{-7}$
$A_8 = 1.25808 \times 10^{-8}$
$A_{10} = -9.76059 \times 10^{-11}$
$A_{12} = 0$
$A_{14} = 0$ 5th surface $K = 7.81893 \times 10^{-5}$
$A_4 = 1.07097 \times 10^{-8}$
$A_6 = -3.17521 \times 10^{-10}$
$A_8 = 2.29420 \times 10^{-11}$
$A_{10} = -5.12313 \times 10^{-13}$
$A_{12} = 0$
$A_{14} = 0$ 7th surface $K = -1.06045 \times 10^{+2}$
$A_4 = -7.41004 \times 10^{-5}$
$A_6 = 3.70162 \times 10^{-6}$
$A_8 = -1.86312 \times 10^{-8}$
$A_{10} = 1.36638 \times 10^{-10}$
$A_{12} = 0$
$A_{14} = 0$ 8th surface $K = 1.57542 \times 10^{+1}$
$A_4 = 4.27535 \times 10^{-5}$
$A_6 = 5.62595 \times 10^{-8}$
$A_8 = 3.02944 \times 10^{-9}$
$A_{10} = 1.27472 \times 10^{-10}$
$A_{12} = 0$
$A_{14} = 0$

EXAMPLE 6

$f = 39.33 \sim 51.54 \sim 67.55$
$F_{NO} = 4.66 \sim 6.10 \sim 8.00$
$\omega = 28.00° \sim 22.54° \sim 17.75°$
$f_B = 11.44 \sim 24.47 \sim 41.56$

| | | | |
|---|---|---|---|
| $r_1 = 112.18686$ (Aspheric) | $d_1 = 2.00000$ | $n_{d1} = 1.49241$ | $\nu_{d1} = 57.66$ |
| $r_2 = 463.61547$ (Aspheric) | $d_2 = 1.25172$ | | |
| $r_3 = -238.87054$ | $d_3 = 10.08442$ | $n_{d2} = 1.51742$ | $\nu_{d2} = 52.43$ |
| $r_4 = -14.56020$ | $d_4 = 0.00000$ | $n_{d3} = 1001.00$ | $\nu_{d3} = -3.45$ |
| $r_5 = -14.55952$ | $d_5 = 1.00000$ | | |

EXAMPLE 6-continued (Dif. sur.)
$r_6 = \infty$ (Stop)    $d_6$ = (Variable)
$r_7 = -33.56188$    $d_7 = 2.55867$    $n_{d4} = 1.49241$    $\upsilon_{d4} = 57.66$
(Aspheric)
$r_8 = -37.64112$    $d_8 = 0.00000$    $n_{d5} = 1001.00$    $\upsilon_{d5} = -3.45$
(Aspheric)
$r_9 = -37.64480$    $d_9 = 5.19557$
(Dif. sur.)
$r_{10} = -7.33628$    $d_{10} = 1.50000$    $n_{d6} = 1.51742$    $\upsilon_{d6} = 52.43$
$r_{11} = -14.19033$

Zooming Spaces

| f | 39.33 | 51.54 | 67.55 |
|---|---|---|---|
| $d_6$ | 10.06894 | 5.89116 | 2.70000 |

Aspherical Coefficients

1st surface $K = -7.65481 \times 10^{+2}$
$A_4 = -4.98245 \times 10^{-5}$
$A_6 = 2.50831 \times 10^{-7}$
$A_8 = -1.11570 \times 10^{-8}$
$A_{10} = 8.92588 \times 10^{-11}$
$A_{12} = 0$
$A_{14} = 0$ 2nd surface $K = -4.20915 \times 10^{+3}$
$A_4 = 4.31962 \times 10^{-7}$
$A_6 = 2.71778 \times 10^{-6}$
$A_8 = -4.89365 \times 10^{-8}$
$A_{10} = 5.00637 \times 10^{-10}$
$A_{12} = 0$
$A_{14} = 0$ 5th surface $K = -4.53438 \times 10^{-4}$
$A_4 = -2.56843 \times 10^{-8}$
$A_6 = -4.65037 \times 10^{-11}$
$A_8 = 4.82009 \times 10^{-12}$
$A_{10} = -1.04845 \times 10^{-13}$
$A_{12} = 0$
$A_{14} = 0$ 7th surface $K = -9.27415 \times 10^{+1}$
$A_4 = -1.55026 \times 10^{-4}$
$A_6 = 9.18635 \times 10^{-6}$
$A_8 = -1.29538 \times 10^{-7}$
$A_{10} = 1.48684 \times 10^{-9}$
$A_{12} = 0$
$A_{14} = 0$ 8th surface $K = 1.57553 \times 10^{+1}$
$A_4 = 4.28426 \times 10^{-5}$
$A_6 = 5.61374 \times 10^{-8}$
$A_8 = 3.04931 \times 10^{-9}$
$A_{10} = 1.27486 \times 10^{-10}$
$A_{12} = 0$
$A_{14} = 0$ 9th surface $K = 1.57347 \times 10^{+1}$
$A_4 = 4.27774 \times 10^{-5}$
$A_6 = 5.51436 \times 10^{-8}$
$A_8 = 3.06281 \times 10^{-9}$
$A_{10} = 1.27023 \times 10^{-10}$
$A_{12} = 0$
$A_{14} = 0$

EXAMPLE 7

$f = 39.33 \sim 63.12 \sim 101.32$
$F_{NO} = 4.66 \sim 6.55 \sim 9.21$
$\omega = 27.98° \sim 18.71° \sim 12.02°$
$f_B = 8.80 \sim 30.02 \sim 64.09$ $r_1 = 80.12904$    $d_1 = 2.00000$    $n_{d1} = 1.49241$    $\upsilon_{d1} = 57.66$
(Aspheric)
$r_2 = 148.52362$    $d_2 = 1.175794$    $n_{d2} = 1.75794$
(Aspheric)
$r_3 = -189.38481$    $d_3 = 2.05117$    $n_{d2} = 1.60562$    $\upsilon_{d2} = 43.70$
$r_4 = 9.92073$    $d_4 = 10.58140$    $n_{d3} = 1.56384$    $\upsilon_{d3} = 60.67$
$r_5 = -13.73034$    $d_5 = 1.00000$
$r_6 = \infty$ (Stop)    $d_6$ = (Variable)
$r_7 = -49.84574$    $d_7 = 2.00000$    $n_{d4} = 1.49241$    $\upsilon_{d4} = 57.66$
(Aspheric)
$r_8 = -75.83966$    $d_8 = 6.23613$
(Aspheric)
$r_9 = -8.53218$    $d_9 = 0.00000$    $n_{d5} = 1001.00$    $\upsilon_{d5} = -3.45$
(Dif. sur.)
$r_{10} = -8.53224$    $d_{10} = 1.50000$    $n_{d6} = 1.51633$    $\upsilon_{d6} = 64.14$
$r_{11} = -22.87514$

Zooming Spaces

| f | 39.33 | 63.12 | 101.32 |
|---|---|---|---|
| $d_6$ | 12.66240 | 6.52561 | 2.70000 |

Aspherical Coefficients

1st surface $K = 7.07311 \times 10^{+1}$
$A_4 = -2.29425 \times 10^{-5}$
$A_6 = 3.74612 \times 10^{-7}$
$A_8 = -7.53021 \times 10^{-10}$
$A_{10} = -8.85595 \times 10^{-11}$
$A_{12} = 0$
$A_{14} = 0$ 2nd surface $K = 3.63260 \times 10^{+2}$
$A_4 = 8.89825 \times 10^{-5}$
$A_6 = 1.03603 \times 10^{-6}$
$A_8 = 5.36900 \times 10^{-9}$
$A_{10} = -1.11943 \times 10^{-10}$
$A_{12} = 0$
$A_{14} = 0$ 7th surface $K = -1.09913 \times 10^{+2}$
$A_4 = 6.23000 \times 10^{-5}$
$A_6 = 9.88073 \times 10^{-7}$
$A_8 = -8.80801 \times 10^{-9}$
$A_{10} = 2.60162 \times 10^{-10}$
$A_{12} = 0$
$A_{14} = 0$ 8th surface $K = -6.10569 \times 10^{+1}$
$A_4 = 6.53091 \times 10^{-5}$
$A_6 = -1.41518 \times 10^{-6}$
$A_8 = 6.91849 \times 10^{-9}$
$A_{10} = 9.95723 \times 10^{-11}$
$A_{12} = 0$
$A_{14} = 0$ 9th surface $K = 0$
$A_4 = 8.58424 \times 10^{-9}$
$A_6 = 2.22881 \times 10^{-10}$
$A_8 = -9.27162 \times 10^{-12}$
$A_{10} = 1.01544 \times 10^{-13}$
$A_{12} = 0$
$A_{14} = 0$

EXAMPLE 8

$f = 39.34\sim63.12\sim101.32$
$F_{NO} = 4.66\sim6.55\sim9.21$
$\omega = 28.00°\sim18.72°\sim12.03°$
$f_B = 8.94\sim32.89\sim71.36$ $r_1 = 101.71139$ $d_1 = 2.00000$ $n_{d1} = 1.49241$ $\nu_{d1} = 57.66$
(Aspheric)
$r_2 = 122.06236$ $d_2 = 6.15631$
(Aspheric)
$r_3 = 561.64371$ $d_3 = 1.5000$ $n_{d2} = 1.62004$ $\nu_{d2} = 36.26$
$r_4 = 18.20739$ $d_4 = 6.83336$ $n_{d3} = 1.52542$ $\nu_{d3} = 64.55$
$r_5 = -13.60769$ $d_5 = 1.00000$
$r_6 = \infty$ (Stop) $d_6 = $ (Variable)
$r_7 = -30.54699$ $d_7 = 2.00000$ $n_{d4} = 1.49241$ $\nu d_4 = 57.66$
(Aspheric)
$r_8 = -30.07660$ $d_8 = 0.00000$ $n_{d5} = 1001.00$ $\nu d_5 = -3.45$
(Aspheric)
$r_9 = -30.07750$ $d_9 = 5.80226$
(Dif. sur.)
$r_{10} = -9.41607$ $d_{10} = 1.50000$ $n_{d6} = 1.51633$ $\nu d_6 = 64.14$
$r_{11} = -26.09511$ Zooming Spaces

| f | 39.34 | 62.12 | 101.32 |
|---|---|---|---|
| $d_6$ | 13.55177 | 5.87277 | 1.08454 |

Aspherical Coefficients

1st surface $K = 8.19415 \times 10^{+1}$
$A_4 = 9.23105 \times 10^{-5}$
$A_6 = 8.45423 \times 10^{-7}$
$A_8 = 3.04438 \times 10^{-10}$
$A_{10} = -4.08688 \times 10^{-11}$
$A_{12} = -2.06011 \times 10^{-13}$
$A_{14} = 0$ 2nd surface $K = 2.11926 \times 10^{+2}$
$A_4 = 1.88966 \times 10^{-4}$
$A_6 = 1.45638 \times 10^{-6}$
$A_8 = 1.50672 \times 10^{-8}$
$A_{10} = -1.93638 \times 10^{-10}$
$A_{12} = 2.17750 \times 10^{-12}$
$A_{14} = 0$ 7th surface $K = -3.57756 \times 10^{+1}$
$A_4 = 2.77722 \times 10^{-5}$
$A_6 = 7.65380 \times 10^{-7}$
$A_8 = 4.06301 \times 10^{-9}$
$A_{10} = 5.59848 \times 10^{-11}$
$A_{12} = 0$
$A_{14} = 0$ 8th surface $K = -2.81460 \times 10^{+1}$
$A_4 = -8.30191 \times 10^{-6}$
$A_6 = -1.91275 \times 10^{-7}$
$A_8 = -4.57137 \times 10^{-10}$
$A_{10} = -1.08375 \times 10^{-10}$
$A_{12} = 0$
$A_{14} = 0$ 9th surface $K = -2.81547 \times 10^{+1}$
$A_4 = -8.33838 \times 10^{-6}$
$A_6 = -1.90523 \times 10^{-7}$
$A_8 = -4.64562 \times 10^{-10}$
$A_{10} = 1.08400 \times 10^{-10}$
$A_{12} = 0$
$A_{14} = 0$

EXAMPLE 9

$f = 39.34\sim63.12\sim101.33$
$F_{NO} = 4.66\sim6.55\sim9.21$
$\omega = 27.97°\sim18.62°\sim11.99°$
$f_B = 8.80\sim29.46\sim62.64$ $r_1 = 60.85682$ $d_1 = 2.00000$ $n_{d1} = 1.49241$ $\nu_{d1} = 57.66$
$r_2 = 119.05071$ $d_2 = 2.55923$
(Aspheric)
$r_3 = -1570.55321$ $d_3 = 1.5000$ $n_{d2} = 1.60342$ $\nu_{d2} = 38.03$
$r_4 = 12.68943$ $d_4 = 8.73457$ $n_{d3} = 1.51633$ $\nu_{d3} = 64.14$
$r_5 = -12.56390$ $d_5 = 1.00000$
$r_6 = \infty$ (Stop) $d_6 = $ (Variable)
$r_7 = -37.67224$ $d_7 = 2.00000$ $n_{d4} = 1.49241$ $\nu d_4 = 57.66$
(Aspheric)
$r_8 = -42.60150$ $d_8 = 0.00000$ $n_{d5} = 1001.00$ $\nu d_5 = -3.45$
$r_9 = -42.60342$ $d_9 = 5.90749$
(Dif. sur.)
$r_{10} = -8.64077$ $d_{10} = 1.50000$ $n_{d6} = 1.62299$ $\nu d_6 = 58.16$
$r_{11} = -20.62500$ Zooming Spaces

| f | 39.34 | 63.12 | 101.33 |
|---|---|---|---|
| $d_6$ | 12.18031 | 6.34159 | 2.70000 |

Aspherical Coefficients

2nd surface $K = 2.52707 \times 10^{+2}$
$A_4 = 9.93041 \times 10^{-5}$
$A_6 = 6.93327 \times 10^{-7}$
$A_8 = -9.60319 \times 10^{-10}$
$A_{10} = 1.26366 \times 10^{-10}$
$A_{12} = 0$
$A_{14} = 0$ 7th surface $K = -2.69383 \times 10^{+1}$
$A_4 = 7.45257 \times 10^{-5}$
$A_6 = -8.98532 \times 10^{-8}$
$A_8 = 1.66180 \times 10^{-8}$
$A_{10} = 3.96775 \times 10^{-11}$
$A_{12} = 0$
$A_{14} = 0$ 9th surface $K = -3.14969 \times 10^{-3}$
$A_4 = 1.10919 \times 10^{-8}$
$A_6 = -5.72024 \times 10^{-10}$
$A_8 = 4.69244 \times 10^{-12}$
$A_{10} = 3.85573 \times 10^{-15}$
$A_{12} = 0$
$A_{14} = 0$ Aberration diagrams for Example 1 at the wide-angle end, standard setting and telephoto end are attached hereto as FIGS. 10, 11 and 12. In these aberration diagrams, (a), (b), (c) and (d) stand for spherical aberration, astigmatism, distortion and chromatic aberration of magnification.

Tabulated below are values regarding conditions (1) to (31) in Examples 1 to 9.

| Example | $V_{d1}$ | $V_{d2}$ | $d_{DOE}/f_1$ | $|d_{DOE}/f_2|$ | $V_{d2pos}$ |
|---|---|---|---|---|---|
| 1 | 60.67 | 55.53 | 0.055 | 0.000 | 64.14 |
| 2 | 64.14 | 54.58 | 0.190 | — | 40.75 |
| 3 | 56.36 | 53.02 | — | 0.180 | 55.78 |
| 4 | 60.67 | 55.53 | 0.199 | 0.195 | 55.78 |
| 5 | 64.14 | 64.14 | 0.038 | 0.060 | — |
| 6 | 52.43 | 52.43 | 0.039 | 0.246 | — |
| 7 | 60.67 | 64.14 | — | 0.063 | — |

-continued

| Example | $V_{d1}$ | $V_{d2}$ | $d_{DOE}/f_1$ | $|d_{DOE'}/f_2|$ | $V_{d2pos}$ |
|---------|----------|----------|---------------|------------------|-------------|
| 8       | 64.55    | 64.14    | —             | 0.257            | —           |
| 9       | 64.14    | 58.16    | —             | 0.322            | —           |

| Example | $|f_t/f_{pwless}|$ | $|f_t/f(y)_{pwless}|$ | $|f_G/f_{DOE}|$ |
|---------|--------------------|------------------------|------------------|
| 1       | —                  | —                      | 27.785           |
|         | —                  | —                      | 23.827           |
| 2       | —                  | —                      | 51.098           |
|         | —                  | —                      | —                |
| 3       | —                  | —                      | —                |
|         | —                  | —                      | 86.250           |
| 4       | 0.062              | —                      | 29.201           |
|         | —                  | —                      | 35.668           |
| 5       | 0.056              | 0.216                  | 16.186           |
|         | 0.014              | 0.197                  | 19.194           |
| 6       | 0.225              | 0.085                  | 12.291           |
|         | 0.085              | 0.168                  | 14.140           |
| 7       | 0.289              | 0.613                  | —                |
|         | 0.334              | 0.270                  | 54.158           |
| 8       | 0.084              | 0.738                  | —                |
|         | 0.061              | 0.534                  | 35.474           |
| 9       | 0.405              | 0.561                  | —                |
|         | 0.133              | 0.477                  | 41.246           |

In the table described just above, the values in the upper row relate to the first lens group, and the values in the lower row relate to the second lens group.

As can be appreciated from the foregoing explanation, the present invention provides a high-performance zoom lens system which, albeit having a high zoom ratio, is sufficiently corrected for chromatic aberrations by proper use of a diffractive surface or surfaces. According to the present invention, a high-performance yet low-cost zoom lens system can be achieved in spite of using a powerless lens or lenses, because chromatic aberrations are sufficiently corrected by means of a diffractive surface or surfaces.

What is claimed is:

1. A zoom lens system consisting of, in order from an object side thereof:
   a first lens group having a positive refracting power; and
   a second lens group having a negative refracting power with a spacing therebetween varying for zooming, each of said first lens group and said second lens group comprising at least two lenses;
   including at least one diffractive surface therein; and
   satisfying the following condition (2):

$$50 < v_{d2} < 85 \tag{2}$$

where $v_{d2}$ is an Abbe's number of a lens having the largest negative refracting power in said second lens group.

2. A zoom lens system consisting of, in order from an object side thereof;
   a first lens group having a positive refracting power; and
   a second lens group having a negative refracting power with a spacing therebetween varying for zooming, each of said first lens group and said second lens group comprising at least two lenses;
   including at least one diffractive surface therein; and
   satisfying the following conditions (1) and (2):

$$50 < v_{d1} < 85 \tag{1}$$
   $$50 < v_{d2} < 85 \tag{2}$$

where $v_{d1}$ is an Abbe's number of a lens having the largest positive refracting power in said first lens group, and $v_{d2}$ is an Abbe's number of a lens having the largest negative refracting power in said second lens group.

3. A zoom lens system comprising, in order from an object side thereof;
   a first lens group having a positive refracting power; and
   a second lens group having a negative refracting power with a spacing therebetween varying for zooming;
   including at least one diffractive surface therein; and
   satisfying the following conditions (5) and (6):

$$0 < d_{DOE}/f_1 < 0.3 \tag{5}$$
   $$50 < v_{d1} < 85 \tag{6}$$

where $d_{DOE}$ is an axial separation from an aperture stop to said diffractive surface, $f_1$ is a focal length of said first lens group, and $_{d1}$ is an Abbe's number of a lens having the largest positive refracting power in said first lens group.

4. The zoom lens system according to claim 3, wherein said diffractive surface is fabricated on the lens having the largest positive refracting power or a surface of a lens adjacent thereto, said surface being opposite to said positive lens.

5. A zoom lens system comprising, in order from an object side thereof;
   a first group having a positive refracting power and a second lens group having a negative refracting power with a spacing therebetween varying for zooming;
   including a diffractive surface in at least said second lens group; and
   satisfying the following conditions (9) and (10):

$$0 < |d_{DOE}/f_2| < 0.35 \tag{9}$$
   $$50 < v_{d2} < 85 \tag{10}$$

where $d_{DOE}'$ is an axial separation from a final surface to said diffractive surface in said second lens group, $f_2$ is a focal length of said second lens group, and $v_{d2}$ is an Abbe's number of a lens having the largest negative refracting power in said second lens group.

6. The zoom lens system according to claim 5, wherein said diffractive surface is fabricated on the lens having the largest negative refracting power or a surface of a lens adjacent thereto, said surface being opposite to said negative lens.

7. The zoom lens system according to any one of claims 1 to 6, wherein said lens having the largest positive refracting power in said second lens group satisfies the following condition (13):

$$40 < v_{d2pos} < 65 \tag{13}$$

where $v_{d2pos}$ is an Abbe's number of a lens having the largest positive refracting power in said second lens group.

8. A zoom lens system comprising at least two lens groups with a spacing therebetween varying for zooming, wherein a diffractive surface is fabricated on at least one surface in at least one lens group, and said at least one lens group consisting of two lenses, a lens having strong power and a powerless lens.

9. A zoom lens system comprising at least two lens groups, wherein a negative lens group is located nearest to an image side of said zoom lens system, spacings between said lens groups vary for zooming, and a diffractive surface is fabricated on at least one surface in said negative lens group, and said negative lens group consisting of two lenses or a powerless lens and a negative lens in order from an object side of said zoom lens system.

10. A zoom lens system comprising at least two lens groups, wherein a spacing between said lens groups varies for zooming, and a plastic powerless lens having an aspherical surface and a diffractive surface fabricated thereon is used in either one of said lens groups.

11. A zoom lens system consisting of, in order from an object side thereof;

a first lens group having a positive refracting power; and a second lens group having a negative refracting power, wherein a spacing between said lens groups varies for zooming, said first lens group comprises a doublet, and said second lens group alone comprises a diffractive surface.

12. A zoom lens system comprising, in order from an object side thereof:

a first lens group having a positive refracting power; and a second lens group having a negative refracting power, wherein a spacing between said lens groups varies for zooming, said first lens comprises at least one diffractive surface and consists of a powerless lens having an aspherical surface and a positive lens, and said second lens group comprises at least one diffractive surface and consists of a powerless lens having an aspherical surface and a negative lens in order from said object side.

13. A zoom lens system comprising, in order from an object side thereof:

a first lens group having a positive refracting power and a second lens group having a negative refracting power, wherein a spacing between said lens groups varies for zooming, said first lens group consists of, in order from said object side, a powerless lens having an aspherical surface and a doublet made up of a negative lens and a positive lens, and said second lens group comprises at least one diffractive surface and consists of a powerless lens having an aspherical surface and a negative lens.

14. The zoom lens system according to any one of claims 8 to 10, 12 and 13, wherein when said powerless lens comprising a diffractive surface is located on said object side with respect to an aperture stop, said powerless lens is convex on said object side, and when said powerless lens is located on an image side with respect to said aperture stop, said powerless lens is convex on said image side.

15. The zoom lens system according to any one of claims 8, 9, 12 and 13 wherein said powerless lens is formed of a plastic.

16. The zoom lens system according to any one of claims 8 to 10, 12 and 13, wherein said powerless lens has refracting power satisfying the following condition (14):

$$|f_t/f_{pwless}|<0.6 \quad (14)$$

where $f_t$ is a focal length of said zoom lens system at a telephoto end thereof, and $f_{pwless}$ is a focal length of said powerless lens.

17. The zoom lens system according to claim 16, wherein a refracting power of a peripheral portion of said powerless lens satisfies the following condition (16):

$$|f_t/f(y)_{pwless}|<0.8 \quad (16)$$

where $f_t$ is the focal length of said zoom lens system at said telephoto end, and f(y) is a focal length of said peripheral portion of said powerless lens, provided that the focal length of said peripheral portion of said powerless lens is defined by:

$$f(y)=1/\{(n-1)(1/r_F(y)-1/r_R(y))\}$$

where n is a d-line refractive index of said powerless lens, $r_F(y)$ is a radius or curvature of said powerless lens on said object side, and $r_R(y)$ is a radius of curvature of said powerless lens on said image side with the proviso that $r_F(y)$ and $r_R(y)$ are each defined as a paraxial radius of curvature in a case where said powerless lens has no aspherical effect, and as a radius of curvature by the following expression in a case where said powerless lens has aspherical effect:

$$r(y)=y(1+f'(y)^2)/f'(y)$$

where y is a height of an axial marginal ray at said telephoto end, and f(y) is a defining function with respect to an aspherical surface.

18. The zoom lens system according to any one of claims 1 to 3,5,8 to 13, wherein said diffractive surface has a focal length satisfying the following condition (18):

$$8<|f_G/f_{DOE}|<100 \quad (18)$$

where $f_G$ is a focal length of a diffractive optical element-including zoom lens group, and $f_{DOE}$ is a focal length of said diffractive optical element.

19. The zoom lens system according to any one of claims 8 to 13, satisfying the following conditions (20) and (21);

$$50<v_{D1}<85 \quad (20)$$
$$50<v_{D2}<85 \quad (21)$$

where $v_{d1}$ is an Abbe's number of a lens having the largest positive refracting power in said first lens group, and $v_{d2}$ is an Abbe's number of a lens having the largest negative refracting power in said second lens group.

20. The zoom lens system according to any one of claims 8 to 13, satisfying the following conditions (24) and (25):

$$0<d_{DOE}/f_1<0.3 \quad (24)$$
$$50<v_{d1}<85 \quad (25)$$

where $d_{DOE}$ is an axial separation from an aperture stop to said diffractive surface, $f_1$ is a focal length of said first lens group, and $v_{d1}$ is an Abbe's number of a lens having the largest positive refracting power in said first lens group.

21. The zoom lens system according to any one of claims 8 to 13, satisfying the following conditions (28) and (29):

$$0<|d_{DOE}'/f_2|<0.35 \quad (28)$$
$$50<v_{d2}<85 \quad (29)$$

where $d_{DOE}'$ is an axial separation from a final surface to said diffractive surface in said second lens group, $f_2$ is a focal length of said second lens group, and $v_{d2}$ is an Abbe's number of a lens having the largest negative refracting power in said second lens group.

22. A zoom lens system comprising, in order from an object side thereof:

a first lens group having a positive refracting power; and
a second lens group having a negative refracting power,
wherein a spacing between said lens groups varies for zooming, said first lens group consists of three lenses or, in order from said object side, a negative lens, a powerless lens and a positive lens, and said second lens group consists of two lenses or, in order from said object side, a positive lens and a negative lens, with diffractive surfaces being used on said powerless lens in said first lens group and on said positive lens in said second lens group.

23. A zoom lens comprising, in order from an object side thereof:
a first lens group having a positive refracting power; and
a second lens group having a negative refracting power,
wherein a spacing between said lens groups varies for zooming, said first lens group consists of two lenses or, in order from said object side, a powerless lens and a positive lens, and said second group consists of two lenses or, in order from said object side, a powerless lens and a negative lens, with diffractive surfaces being used on said positive lens in said first lens group and on said negative lens in said second lens group.

24. A zoom lens system comprising, in order from an object side thereof:
a first lens group having a positive refracting power; and
a second lens group having a negative refracting power,
wherein a spacing between said lens groups varies for zooming, said first lens group consists of two lenses or, in order from said object side, a powerless lens and a positive lens, and said second lens group consists of two lenses or, in order from said object side, a powerless lens and a negative lens, with diffractive surfaces being used on said positive lens in said first lens group and on said powerless lens in said second lens group.

25. A zoom lens system comprising, in order from an object side thereof:
a first lens group having a positive refracting power; and
a second lens group having a negative refracting power,
wherein a spacing between said lens groups varies for zooming, said first lens group consists of three lenses or, in order from said object side, a powerless lens and a doublet made up of a negative lens and a positive lens, and said second lens group consists of two lenses or, in order from said object side, a powerless lens and a negative lens, with a diffractive surface being used on said negative lens in said second lens group.

26. A zoom lens system comprising, in order from an object side thereof:
a first lens group having a positive refracting power; and
a second lens group having a negative refracting power, wherein a spacing between said first lens group and said second lens group varies for zooming, said first lens group consists of three lenses or, in order from said object side, a powerless lens and a doublet made up of a negative lens and a positive lens, and said second lens group consists of two lenses or, in order from said object side, a powerless lens and a negative lens, with a diffractive surface being used on said powerless lens in said second lens group.

27. A zoom lens system comprising, in order from an object side thereof:
a first lens group having a positive refracting power; and
a second lens group having a negative refracting power with a spacing therebetween varying for zooming, each of said first lens group and said second lens group comprising at least two lenses;
including at least one diffractive surface therein; and
satisfying the following condition (2):

$$50 < \nu_{d2} < 85 \quad (2)$$

where $\nu_{d2}$ is an Abbe's number of a lens having the largest negative refracting power in said second lens group,
wherein said lens having the largest positive refracting power in said second lens group satisfies the following condition (13):

$$40 < \nu_{d2pos} < 65 \quad (13)$$

where $\nu_{d2pos}$ is an Abbe's number of a lens having the largest positive refracting power in said second lens group.

28. A zoom lens system comprising, in order from an object side thereof:
a first lens group having a positive refracting power; and
a second lens group having a negative refracting power with a spacing therebetween varying for zooming, each of said first lens group and said second lens group comprising at least two lenses;
including at least one diffractive surface therein; and
satisfying the following conditions (1) and (2):

$$50 < \nu_{d1} < 85 \quad (1)$$
$$50 < \nu_{d2} < 85 \quad (2)$$

where $\nu_{d1}$ is an Abbe's number of a lens having the largest positive refracting power in said first lens group, and $\nu_{d2}$ is an Abbe's number of a lens having the largest negative refracting power in said second lens group,
wherein said lens having the largest positive refracting power in said second lens group satisfies the following condition (13):

$$40 < \nu_{d2pos} < 65 \quad (13)$$

where $\nu_{d2pos}$ is an Abbe's number of a lens having the largest positive refracting power in said second lens group.

29. A zoom lens system comprising, in order from an object side thereof:
a first lens group having a positive refracting power; and
a second lens group having a negative refracting power with a spacing therebetween varying for zooming, each of said first lens group and said second lens group comprising at least two lenses;
including at least one diffractive surface therein; and
satisfying the following condition (2):

$$50 < \nu_{d2} < 85 \quad (2)$$

where $\nu_{d2}$ is an Abbe's number of a lens having the largest negative refracting power in said second lens group,
wherein said diffractive surface has a focal length satisfying the following condition (18):

$$8 < |f_G/f_{DOE}| < 100 \quad (18)$$

where $f_G$ is a focal length of a diffractive optical element-including zoom lens group, and $f_{DOE}$ is a focal length of said diffractive optical element.

30. A zoom lens system comprising, in order from an object side thereof:

a first lens group having a positive refracting power; and a second lens group having a negative refracting power with a spacing therebetween varying for zooming, each of said first lens group and said second lens group comprising at least two lenses;

including at least one diffractive surface therein; and satisfying the following conditions (1) and (2):

$$50 < v_{d1} < 85 \tag{1}$$

$$50 < v_{d2} < 85 \tag{2}$$

where $v_{d1}$ is an Abbe's number of a lens having the largest positive refracting power in said first lens group, and $v_{d2}$ is an Abbe's number of a lens having the largest negative refracting power in said second lens group, wherein said diffractive surface has a focal length satisfying the following condition (18):

$$8 < |f_G/f_{DOE}| < 100 \tag{18}$$

where $f_G$ is a focal length of a diffractive optical element-including zoom lens group, and $f_{DOE}$ is a focal length of said diffractive optical element.

31. A zoom lens system comprising, in order from an object side thereof:

a first lens group having a positive refracting power; and a second lens group having a negative refracting power, wherein a spacing between said lens groups varies for zooming, said first lens group comprises a doublet, and said second lens group alone comprises a diffractive surface, wherein said diffractive surface has a focal length satisfying the following condition (18):

$$8 < |f_G/f_{DOE}| < 100 \tag{18}$$

where $f_G$ is a focal length of a diffractive optical element-including zoom lens group, and $f_{DOE}$ is a focal length of said diffractive optical element.

32. A zoom lens system comprising, in order from an object side thereof:

a first lens group having a positive refracting power; and a second lens group having a negative refracting power, wherein a spacing between said lens groups varies for zooming, said first lens group comprises a doublet, and said second lens group alone comprises a diffractive surface, and said zoom lens system satisfies the following conditions (20) and (21);

$$50 < v_{D1} < 85 \tag{20}$$

$$50 < v_{D2} < 85 \tag{21}$$

where $v_{d1}$ is an Abbe's number of a lens having the largest positive refracting power in said first lens group, and $v_{d2}$ is an Abbe's number of a lens having the largest negative refracting power in said second lens group.

33. A zoom lens system comprising, in order from an object side thereof:

a first lens group having a positive refracting power; and a second lens group having a negative refracting power, wherein a spacing between said lens groups varies for zooming, said first lens group comprises a doublet, and said second lens group alone comprises a diffractive surface, and said zoom lens system satisfies the following conditions (24) and (25):

$$0 < d_{DOE}/f_1 < 0.3 \tag{24}$$

$$50 < v_{d1} < 85 \tag{25}$$

where $d_{DOE}$ is an axial separation from an aperture stop to said diffractive surface, $f_1$ is a focal length of said first lens group, and $v_{d1}$ is an Abbe's number of a lens having the largest positive refracting power in said first lens group.

34. A zoom lens system comprising, in order from an object side thereof:

a first lens group having a positive refracting power; and a second lens group having a negative refracting power, wherein a spacing between said lens groups varies for zooming, said first lens group comprises a doublet, and said second lens group alone comprises a diffractive surface said zoom lens system satisfies the following conditions (28) and (29):

$$0 < |d_{DOE}'/f_2| < 0.35 \tag{28}$$

$$50 < v_{d2} < 85 \tag{29}$$

where $d_{DOE}'$ is an axial separation from a final surface to said diffractive surface in said second lens group, $f_2$ is a focal length of said second lens group, and $v_{d2}$ is an Abbe's number of a lens having the largest negative refracting power in said second lens group.

* * * * *